(12) United States Patent
Chen et al.

(10) Patent No.: US 10,033,279 B2
(45) Date of Patent: Jul. 24, 2018

(54) DC-DC VOLTAGE CONVERTER AND ASSOCIATED CONTROL METHOD CAPABLE OF DYNAMICALLY ADJUSTING UPPER BOUNDARY OF INDUCTOR CURRENT

(71) Applicant: MediaTek Singapore Pte. Ltd., Singapore (SG)

(72) Inventors: Tun-Shih Chen, Pingtung County (TW); Fan Yang, Clear Water Bay (HK)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 15/485,255

(22) Filed: Apr. 12, 2017

(65) Prior Publication Data
US 2017/0302166 A1  Oct. 19, 2017

Related U.S. Application Data

(60) Provisional application No. 62/324,361, filed on Apr. 19, 2016.

(51) Int. Cl.
*H02M 3/158* (2006.01)
*H02M 3/156* (2006.01)
*H02M 1/00* (2006.01)

(52) U.S. Cl.
CPC ............ *H02M 3/158* (2013.01); *H02M 3/156* (2013.01); *H02M 2001/0019* (2013.01);
(Continued)

(58) Field of Classification Search
CPC ......... H02M 3/158–3/1588; H02M 2001/0009
See application file for complete search history.

(56) References Cited

U.S. PATENT DOCUMENTS

| | | |
|---|---|---|
| RE37,609 E | 3/2002 | Bittner |
| 6,366,070 B1 | 4/2002 | Cooke et al. |
| | (Continued) | |

FOREIGN PATENT DOCUMENTS

EP    2012415 A2    1/2009

OTHER PUBLICATIONS

EPO Search Report dated Oct. 5, 2017 in EP application (No. 17167018.5-1809/3240171).

*Primary Examiner* — Gary L Laxton
*Assistant Examiner* — Peter Novak
(74) *Attorney, Agent, or Firm* — McClure, Qualey & Rodack, LLP

(57) ABSTRACT

A DC-DC voltage converter and associated control method capable of dynamically adjusting upper boundary of the inductor current are provided. The DC-DC voltage converter is electrically connected to an input terminal having an input voltage and an output terminal having an output voltage. The DC-DC voltage converter converts the input voltage to the output voltage, and the DC-DC voltage converter operates in a pulse frequency modulation mode. The DC-DC voltage converter includes an inductor and a converting circuit, which are electrically connected to each other. An inductor current flows through the inductor. The converting circuit adjusts the inductor current according to a setting signal so that the inductor current is less than or equivalent to an upper boundary of the inductor current.

16 Claims, 18 Drawing Sheets

(52) U.S. Cl.
CPC ............... *H02M 2001/0025* (2013.01); *H02M 2001/0035* (2013.01); *H02M 2003/1566* (2013.01)

(56) References Cited

U.S. PATENT DOCUMENTS

| | | | |
|---|---|---|---|
| 6,396,251 B2 | 5/2002 | Corva et al. | |
| 6,396,252 B1 * | 5/2002 | Culpepper | H02M 3/156 323/225 |
| 6,628,109 B2 | 9/2003 | Rincon-Mora | |
| 7,102,339 B1 | 9/2006 | Ferguson | |
| 7,173,404 B2 | 2/2007 | Wu | |
| 7,327,127 B2 | 2/2008 | Ho | |
| 7,439,720 B2 | 10/2008 | Nguyen et al. | |
| 7,714,556 B2 | 5/2010 | Chu et al. | |
| 7,719,251 B2 | 5/2010 | Qahouq et al. | |
| 8,228,047 B2 | 7/2012 | Li et al. | |
| 8,253,397 B2 | 8/2012 | Collins | |
| 8,283,907 B1 * | 10/2012 | Jayaraj | H02M 3/156 323/282 |
| 8,427,123 B2 | 4/2013 | Dearborn | |
| 8,599,581 B2 | 12/2013 | Huang et al. | |
| 8,698,470 B2 | 4/2014 | Ju | |
| 8,710,818 B2 | 4/2014 | Yu et al. | |
| 8,780,590 B2 | 7/2014 | So et al. | |
| 8,896,383 B2 | 11/2014 | Dhanasekaran | |
| 8,912,773 B2 | 12/2014 | Parto et al. | |
| 8,957,651 B2 | 2/2015 | Cleveland et al. | |
| 9,647,558 B2 * | 5/2017 | Houston | H02M 3/1588 |
| 2008/0158915 A1 * | 7/2008 | Williams | H02M 3/07 363/21.06 |
| 2009/0160422 A1 | 6/2009 | Isobe et al. | |
| 2011/0037446 A1 | 2/2011 | Engelhardt et al. | |
| 2014/0055107 A1 | 2/2014 | Tsuruoka et al. | |
| 2014/0268913 A1 | 9/2014 | Zheng et al. | |
| 2014/0328090 A1 | 11/2014 | Takahashi et al. | |
| 2014/0347027 A1 | 11/2014 | Jayaraj et al. | |
| 2015/0061624 A1 | 3/2015 | Lalithambika et al. | |
| 2015/0214827 A1 | 7/2015 | Yoon et al. | |
| 2015/0288285 A1 | 10/2015 | Paul et al. | |
| 2015/0311795 A1 | 10/2015 | Yang et al. | |

* cited by examiner

DC-DC VOLTAGE CONVERTER AND ASSOCIATED CONTROL METHOD CAPABLE OF DYNAMICALLY ADJUSTING UPPER BOUNDARY OF INDUCTOR CURRENT

This application claims the benefit of U.S. provisional application Ser. No. 62/324,361, filed Apr. 19, 2016, the disclosure of which is incorporated by reference herein in its entirety.

TECHNICAL FIELD

The disclosure relates in general to a DC-DC voltage converter and associated control method, and more particularly to a DC-DC voltage converter and associated control method capable of dynamically adjusting upper boundary of an inductor current.

BACKGROUND

In electronic products, an integrated circuit (hereinafter, IC) chip is cooperatively used with other components. Generally, a DC-DC voltage converter is employed to transform an input voltage Vin to an output voltage Vout, which is further utilized by the IC chip for operation.

FIG. 1 (prior art) is a schematic diagram illustrating a DC-DC voltage converter. After receiving an input voltage Vin, the DC-DC voltage converter 11 accordingly converts and generates an output voltage Vout at an output terminal Nout. An output capacitor Cout is electrically connected between the output terminal Nout and a ground terminal Gnd. A loading circuit 13 (for example, an IC chip) receives the output voltage Vout, and a current flowing to the loading circuit 13 is defined as an output current Iout.

The DC-DC voltage converter 11 may provide a dual-mode function in response to load changing of the loading circuit 13. With the dual mode function, the DC-DC voltage converter 11 is capable of automatically switching between a pulse width modulation (hereinafter, PWM) mode and a pulse frequency modulation (hereinafter, PFM) mode. Basically, the PWM mode and the PFM mode are relatively suitable for heavy loading application and light loading application, respectively. The output current in the PFM mode ($Iout_{PFM}$) is lower than the output current in the PWM mode ($Iout_{PWM}$).

Determination of switching between the PWM mode and the PFM mode is related to many factors such as the input voltage Vin, the output voltage Vout, an inductor L, and the output capacitor Cout and so forth. Therefore, timing and threshold of switching mode of the DC-DC voltage converter 11 is complicated, and stableness of the output voltage Vout and conversion efficiency can be affected during mode switching. Alternatively speaking, mode switching may degrade performance of the DC-DC voltage converter 11 when the loading of the loading circuit 13 is close to the transition value between the PFM mode and the PWM mode.

Therefore, for the DC-DC voltage converter 11, having some tolerance for loading variation and maximizing performance at the same time without changing its operation mode is desirable.

SUMMARY

The disclosure is directed to a DC-DC voltage converter and associated control method capable of dynamically adjusting an upper boundary of an inductor current.

According to one embodiment, a DC-DC voltage converter is provided. The DC-DC voltage converter is electrically connected to an input terminal having an input voltage and an output terminal having an output voltage. The DC-DC voltage converter converts the input voltage to the output voltage, wherein the DC-DC voltage converter operates in a pulse frequency modulation mode. The DC-DC voltage converter includes an inductor and a converting circuit, wherein an inductor current flows through the inductor. The converting circuit is electrically connected to the inductor. The converting circuit adjusts the inductor current according to a setting signal so that the inductor current is less than or equivalent to an upper boundary of the inductor current.

According to another embodiment, a control method applied to a DC-DC voltage converter is provided. The DC-DC voltage converter operates in a pulse frequency modulation mode and the DC-DC voltage converter includes an inductor and a converting circuit. The control method includes following steps. Firstly, an input voltage is received at an input terminal. Then, the input voltage is converted to an output voltage at an output terminal, wherein an inductor current flows through the inductor. The inductor current is adjusted according to a setting signal so that the inductor current is less than or equivalent to an upper boundary of the inductor current.

Figure 1:
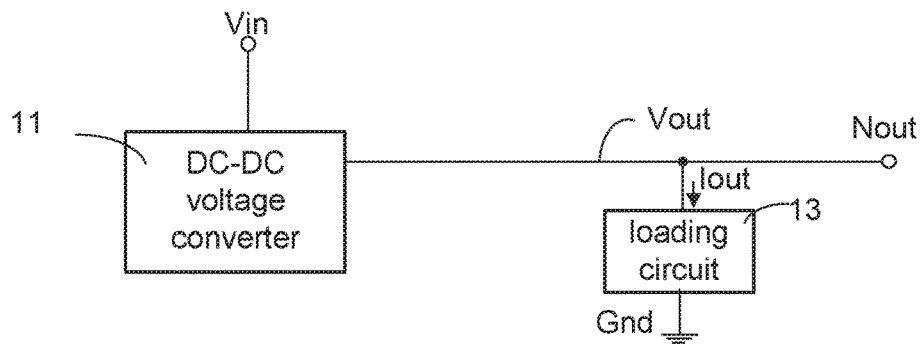
FIG. 1 (prior art) is a schematic diagram illustrating a DC-DC voltage converter.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

As illustrated above, the output current Iout of the conventional DC-DC voltage converter in the PFM mode is limited so that the DC-DC voltage converter needs to transit from the PFM mode to the PWM mode if the loading of the loading circuit increases. However, mode switching of the DC-DC voltage converter lowers performance of the DC-DC voltage converter.

To solve this issue, a control method applied to the DC-DC voltage converter is provided in the present disclosure. With the control method, the output current Iout of the DC-DC voltage converter can be dynamically changed in response to the loading of the loading circuit while the DC-DC voltage converter is in the PFM mode.

A buck converter (step-down converter) is a DC-DC voltage converter which steps down voltage from its input to its output. A buck converter is illustrated as an example about how the control method is applied. The control method can be applied to different types of the DC-DC voltage converter operating in the PFM mode.

Figure 2:
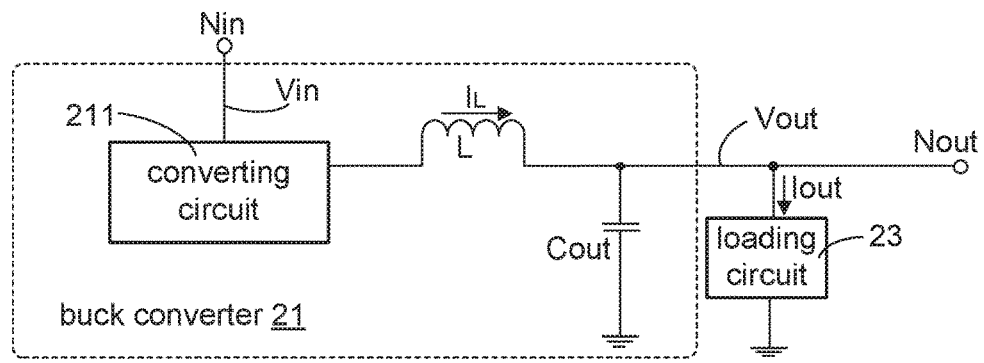
FIG. 2 is a schematic diagram illustrating a buck converter.
Figure 3:
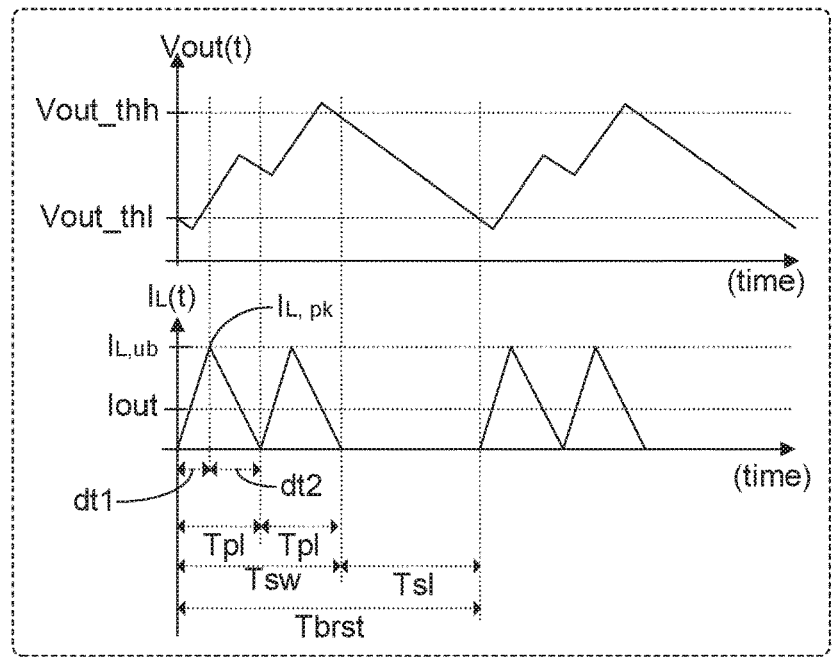
FIG. 3 is a schematic waveform diagram illustrating operation of a DC-DC voltage converter in the PFM mode.

Please refer to FIGS. 2 and 3 together. FIG. 2 is a schematic diagram illustrating a buck converter. The buck converter 21 includes a converting circuit 211 and an inductor L. The buck converter 21 receives the input voltage Vin from an input terminal Nin and generates the output voltage Vout at an output terminal Nout. An inductor current $I_L$ flows through the inductor L and the output current Iout flows through the loading circuit 23.

In PFM mode, a series of inductor current pulses are applied to the loading circuit 23 and the output capacitor Cout to maintain the output voltage Vout. Theoretically speaking, efficiency of the buck converter 21 is related to a peak value of the inductor current $I_L$ (that is, a peak inductor current $I_{L,pk}$). The operations of different types of the DC-DC voltage converters in PFM mode are similar in some aspects, and operation of the buck converter 21 can be referred for illustration purpose.

FIG. 3 is a schematic waveform diagram illustrating operation of a DC-DC voltage converter in the PFM mode. The first waveform and the second waveform respectively represent the output voltage Vout and the inductor current $I_L$.

Please refer to FIGS. 2 and 3 together. According to FIG. 3, when the output voltage Vout drops and becomes less than a lower threshold Vout_thl, the burst duration Tbrst starts and charges are delivered to the inductor L. Then, the output voltage Vout starts to increase. Once the output voltage Vout becomes greater than or equivalent to an upper threshold Vout_thh, the buck converter 21 stops generating the inductor current $I_L$, and the buck converter 21 changes to a sleep status.

When the buck converter 21 is at the sleep status, the inductor current $I_L$ stays at zero. Utilization of the sleep duration Tsl can reduce the switching loss Psw of the buck converter in the PFM mode.

As shown in FIG. 3, the operation of the buck converter 21 is repeated in a periodic base with a burst duration Tbrst. Each of the burst durations Tbrst includes an active duration Tsw and a sleep duration Tsl, and the active duration Tsw includes one or more (N) pulses of the inductor current $I_L$. N represents number of pulses during the active duration Tsw.

In FIG. 3, Tpl represents the duration of a pulse of the inductor current $I_L$ (that is, a pulse duration), and a pulse frequency fpl can be defined as fpl=1/Tpl.

During the sleep duration Tsl, the buck converter 21 remains at sleep status and the output voltage Vout drops. A burst duration Tbrst is equivalent to N*Tpl+Tsl, and a burst frequency can be defined by fb=1/Tbrst.

In each pulse of the inductor current $I_L$, the inductor current $I_L$ increases for a first sub-pulse duration dt1 and decreases for a second sub-pulse duration dt2. During the first sub-pulse duration dt1, the inductor current $I_L$ is increased until its peak value (hereinafter, peak inductor current $I_{L,pk}$) is equivalent to an upper boundary of the inductor current $I_{L,ub}$. That is, $I_{L,pk}=I_{L,ub}$. During the second sub-pulse duration dt2, the inductor current $I_L$ is decreased until its value is equivalent to zero. Alternatively speaking, the inductor current $I_L$ ramps up during the first sub-pulse duration dt1 and depletes to zero during the second sub-pulse duration dt2.

Basically, the upper boundary of the inductor current $I_{L,ub}$ is related to number of pulses included in the active duration Tsw. Moreover, number of pulses included in the active duration Tsw changes length of the burst duration Tbrst. Relationship between the upper boundary of the inductor current $I_{L,ub}$, number of pulses included in the active duration Tsw, and the length of the burst duration Tbrst are illustrated below.

Figure 4A:
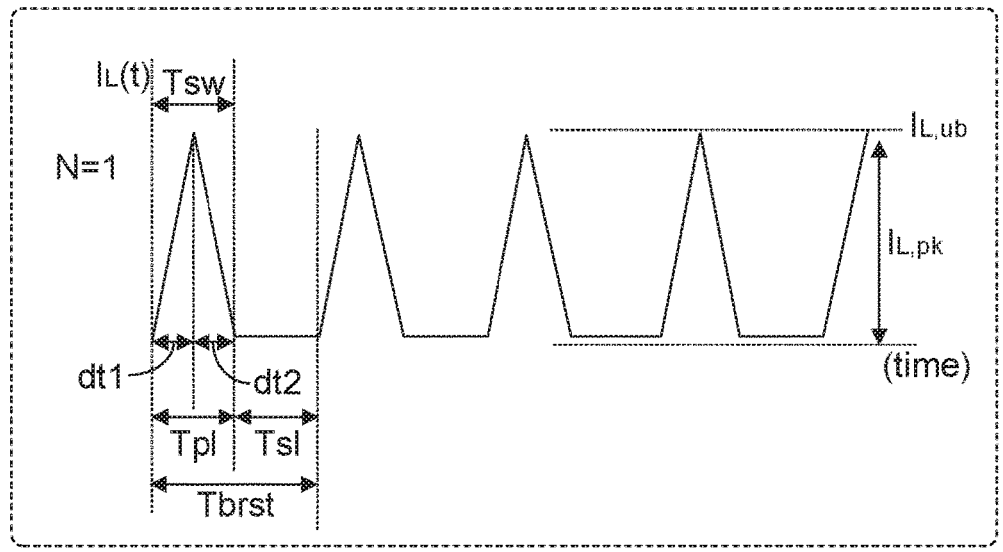
FIG. 4A is a waveform diagram illustrating changes of inductor current of the buck converter in the PFM mode with a relatively shorter burst duration.

FIG. 4A is a waveform diagram illustrating changes of inductor current of the buck converter in the PFM mode with a relatively shorter burst duration. In FIG. 4A, the upper boundary of the inductor current $I_{L,ub}$ is higher, and the active duration Tsw is assumed to include one pulse duration, that is, N=1.

Figure 4B:
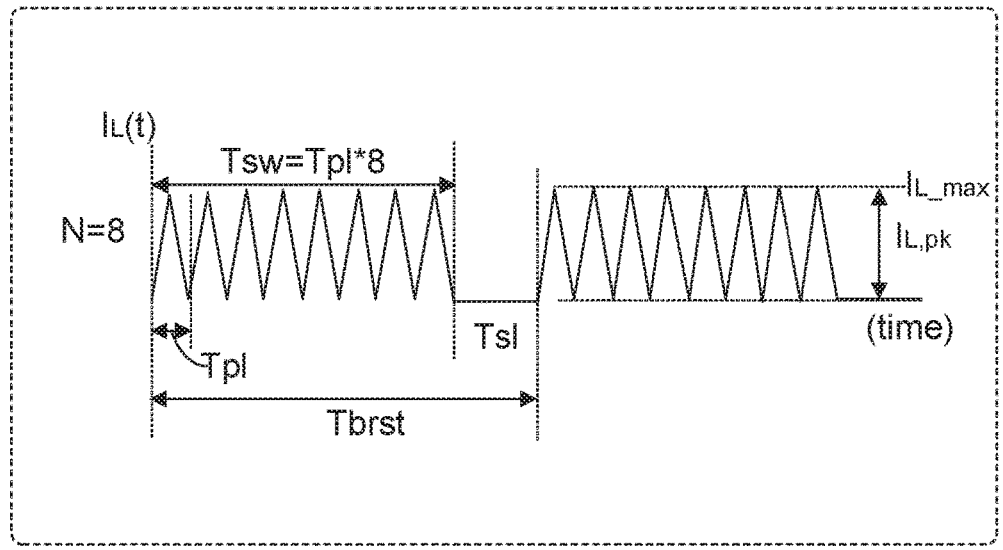
FIG. 4B is a waveform diagram illustrating changes of inductor current of the buck converter in the PFM mode with a relatively longer burst duration.

FIG. 4B is a waveform diagram illustrating changes of inductor current of the buck converter in the PFM mode with a relatively longer burst duration. In FIG. 4B, the upper boundary of the inductor current $I_{L,ub}$ is lower, and the active duration Tsw is assumed to include eight pulse durations, that is, N=8.

Please refer to FIGS. 4A and 4B together. The upper boundary of the inductor current $I_{L,ub}$ in FIG. 4B is lower than that in FIG. 4A. Moreover, more pulses are included in the active duration Tsw in FIG. 4B than that in FIG. 4A. In consequence, length of the active duration Tsw in FIG. 4B is longer than length the active duration Tsw in FIG. 4A.

In contrast with the different active duration Tsw in FIGS. 4A and 4B, the sleep duration Tsl is related to the output capacitor Cout and the loading circuit 23 only. In other words, the buck converter 21 suspends its operation during the sleep duration Tsl regardless the upper boundary of the inductor current $I_{L,ub}$. Consequentially, the duration of output voltage Vout dropping is a constant value, and the sleep duration Tsl in FIG. 4A is equivalent to that in FIG. 4B.

Since the pulse of the inductor current $I_L$ is in a triangle shape, an average pulse inductor current $I_{L,avg,pl}$ can be represented as half of the peak inductor current $I_{L,pk}$, that is, $$I_{L,avg,pl} = \frac{I_{L,pk}}{2}.$$

Moreover, the average inductor current $I_{L,avg}$ during the active duration Tsw can be represented as summation of an offset current $I_{L,offset}$ and the average pulse inductor current $$\frac{I_{L,pk}}{2},$$

that is, $$I_{L,avg} = \left(I_{L,offset} + \frac{I_{L,pk}}{2}\right).$$

For the sake of illustration, the offset current $I_{L,offset}$ can be assumed to be zero. Moreover, since the loading circuit 23 discharges from the output capacitor Cout, the fluctuation of the output capacitor Cout, that is, $Cout \cdot V_r$, can represent the discharging operation of the loading circuit 23. The variable $V_r$ is a ripple voltage representing changes of the output voltage Vout. Difference between the average inductor current $$\frac{I_{L,pk}}{2}$$

and the output Iout can represent the charging speed of the output capacitor Cout during the active duration Tsw. Therefore, the active duration Tsw can be represented by equation (1).

$$Tsw = N \cdot Tpl = \frac{Cout \cdot V_r}{\frac{I_{L,pk}}{2} - Iout} \quad \text{equation (1)}$$

On the other hand, equation (2) shows that charges being discharged by the loading circuit 23 during the sleep duration Tsl can be represented by the output current Iout times the sleep duration Tsl.

$$Cout \cdot V_r = Iout \cdot T_{sl} \quad \text{equation (2)}$$

For the buck converter 21, the charges being charged during the active duration Tsw are equivalent to the charges being discharged by the loading circuit. Therefore, equations (1) and (2) can be further represented as equation (3).

$$\left(\frac{I_{L,pk}}{2} - Iout\right) \cdot N \cdot Tpl \cdot = Cout \cdot V_r = Iout \cdot T_{sl} \quad \text{equation (3)}$$

According to equation (3), changes of the peak inductor current $I_{L,pk}$ and the output current Iout are related to relationship between the active duration Tsw=N*Tpl and the sleep duration Tsl. Alternatively speaking, a predefined rule based on the upper boundary of the inductor current $I_{L,ub}$ and the output current Iout can be utilized to adjust relationship between the active duration Tsw=N*Tpl and the sleep duration Tsl.

$$I_{L,ub,opt} \approx 2 \cdot (Iout + \Delta I_L) \quad \text{equation (4)}$$

Equation (4) shows that an optimized upper boundary of the inductor current $I_{L,ub,opt}$ is assumed to be equivalent to double of a summation of the output current Iout and a margin inductor current $\Delta I_L$. Depending on different predefined rule, value of the margin inductor current $\Delta I_L$ can be freely determined. In practical application, the predefined rule can be related to at least one of an output current Iout flowing through a loading circuit electrically connected to the output terminal Nout, a margin inductor current $\Delta I_L$, an operation mode of the loading circuit, the input voltage Vin and the output voltage Vout.

According to a first example of the predefined rule, the margin inductor current $\Delta I_L$ can be defined to be equivalent to a ratio of the output current Iout, that is $\Delta I_L = \alpha *$Iout. The ratio $\alpha$ is constant regardless change of the output current Iout. Then, equation (4) can be further represented as equation (5).

$$I_{L,ub,opt} = 2 \cdot (Iout + \Delta I_L) = 2 \cdot (Iout + \alpha * Iout) \quad \text{equation (5)}$$

Once the optimized upper boundary of peak inductor $I_{L,ub}$ is set according to equation (5), equation (3) can be re-written as below. Moreover, a relationship between the pulse duration Tpl and the sleep duration Tsl can be obtained.

$$\left(\frac{I_{L,pk}}{2} - Iout\right) \cdot N \cdot Tpl \cdot = Cout \cdot V_r = Iout \cdot T_{sl} \quad \text{equation (6)}$$

$$N \cdot Tpl \cdot ((Iout + \alpha \cdot Iout) - Iout) = N \cdot Tpl \cdot \alpha \cdot Iout = Iout \cdot Tsl$$

$$N \cdot Tpl = \frac{Tsl}{\alpha}$$

Equation (6) shows that the relationship between the active duration Tsw=N*Tpl and the sleep duration Tsl can be adjusted based on setting of the variable $\alpha$. When the optimized upper boundary of the inductor current $I_{L,ub,opt}$ is set according to equation (5), and when the relationship of the active duration Tsw=N*Tpl and the sleep duration Tsl satisfies equation (6), the buck converter 21 can stay at a balanced state. When the buck converter 21 is at the balanced state, the output voltage Vout is changed in between the lower threshold Vout_thl and the upper threshold Vout_thh.

According to a second example of the predefined rule, the margin inductor current $\Delta I_L$ can be defined to be a constant current Iconst, that is, $\Delta I_L$=Iconst. Then the optimized peak inductor current $I_{L,ub,opt}$ in equation (4) can be represented by equation (7).

$$I_{L,ub,opt}=2\cdot(Iout+\Delta I_L)=2\cdot(Iout+Iconst) \quad \text{equation (7)}$$

Once the optimized upper boundary of peak inductor $I_{L,ub}$ is set according to equation (7), equation (3) can be re-written to obtain relationship between the active duration Tsw=N*Tpl and the sleep duration Tsl.

$$N\cdot Tpl = \frac{Cout\cdot Vr}{\Delta I} = \frac{Cout\cdot Vr}{Iconst} \quad \text{equation (8)}$$

When the optimized upper boundary of the inductor current $I_{L,ub,opt}$ is set according to equation (7), and when the relationship of the active duration Tsw=N*Tpl and the sleep duration Tsl satisfies equation (8), the buck converter 21 can stay at the balanced state.

Figure 5A:
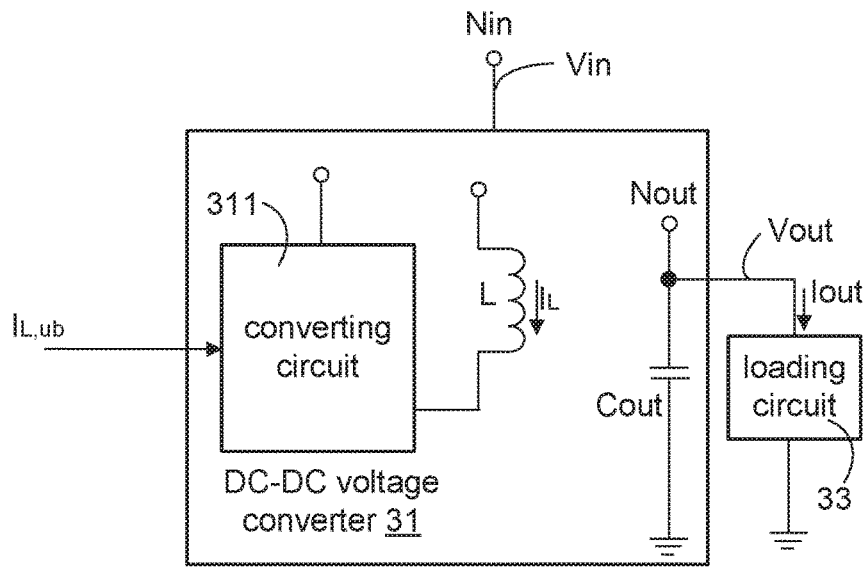
FIG. 5A is a schematic diagram illustrating a DC-DC voltage converter capable of adaptively adjusting peak inductor current according to an embodiment of the present disclosure.

FIG. 5A is a schematic diagram illustrating a DC-DC voltage converter capable of adaptively adjusting peak inductor current according to an embodiment of the present disclosure. The DC-DC voltage converter 31 includes an inductor L, a converting circuit 311, and an output capacitor Cout. The output capacitor Cout is electrically connected to the loading circuit 33 through an output terminal Nout. The inductor L is electrically connected to the converting circuit 311, and the converting circuit 311 receives a setting signal representing an upper boundary of the inductor current $I_{L,ub}$.

Depending on types of DC-DC voltage converters 31, the connections between the input terminal Nin, the output terminal Nout, the converting circuit 311, and the inductor L may change. For example, a buck converter, a buck-boost converter, and a boost converter are widely used DC-DC voltage converters 31 and their internal connections are different.

In a case that the DC-DC voltage converter 31 is a buck converter, the converting circuit 311 is electrically connected to the input terminal Nin, and the inductor L is electrically connected to the output terminal Nout. In a case that the DC-DC voltage converter 31 is a buck-boost converter, both the two terminals of the inductor L are electrically connected to the converting circuit, and the converting circuit 311 is electrically connected to both the input terminal Nin and the output terminal Nout. That is, the inductor L is disconnected to the input and the output terminals in the buck-boost converter. In a case that the DC-DC voltage converter 31 is a boost converter, the inductor L is electrically connected to the input terminal Nin and the converting circuit 311, and the converting circuit 311 is electrically connected to the output terminal Nout.

Figure 5B:
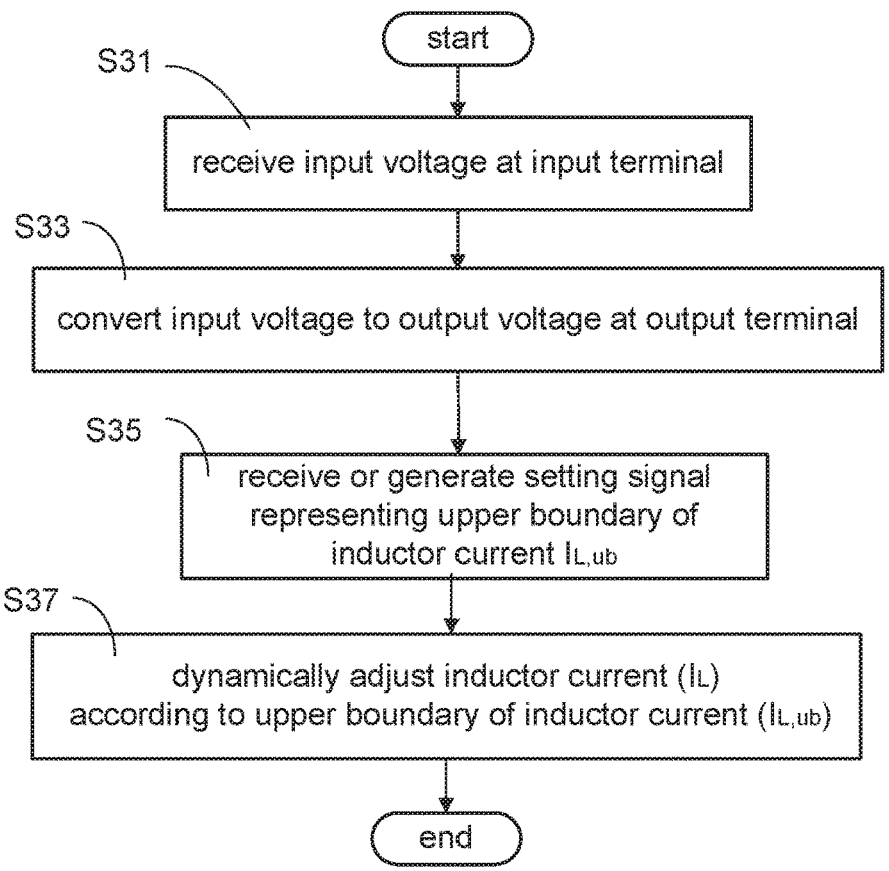
FIG. 5B is a flow diagram illustrating the control method applied to the DC-DC voltage converter shown in FIG. 5A.

FIG. 5B is a flow diagram illustrating the control method applied to the DC-DC voltage converter 31 shown in FIG. 5A. Firstly, the converting circuit 311 receives an input voltage Vin at the input terminal Nin (step S31), and converts the input voltage Vin to an output voltage Vout at the output terminal Nout (step S33). Then, the converting circuit 311 receives or generates a setting signal which represents the upper boundary of the inductor current $I_{L,ub}$ (step S35). Then, the converting circuit 311 dynamically adjusts the inductor current $I_L$ according to the upper boundary of the inductor current $I_{L,ub}$ (step S37). The flow is executed repeatedly.

In practical application, origin of the setting signal is not limited, and some examples about generation of the setting signal are illustrated in FIGS. 7A~7D. Although the embodiments of the present disclosure are mainly based on the buck converter, there are many types of the DC-DC voltage converters, and the concept of the present disclosure can be applied to other types of the DC-DC voltage converters.

FIGS. 6A, 6B, 6C and 6D are schematic diagrams illustrating a buck converter capable of dynamically adjusting the upper boundary of the inductor current $I_{L,ub}$ according to the embodiment of the present disclosure. The buck converter 41 includes the capacitor C, the inductor L and the converting circuit 411. Optionally, the buck converter 41 may further include an adaptive circuit 413.

Figure 6A:
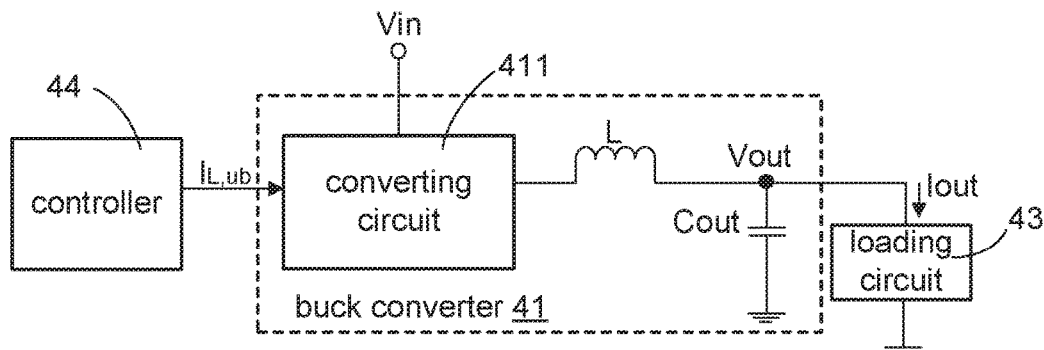
FIGS. 6A, 6B, 6C and 6D are schematic diagrams illustrating a buck converter capable of dynamically adjusting the upper boundary of the inductor current according to the embodiment of the present disclosure.
Figure 6B:
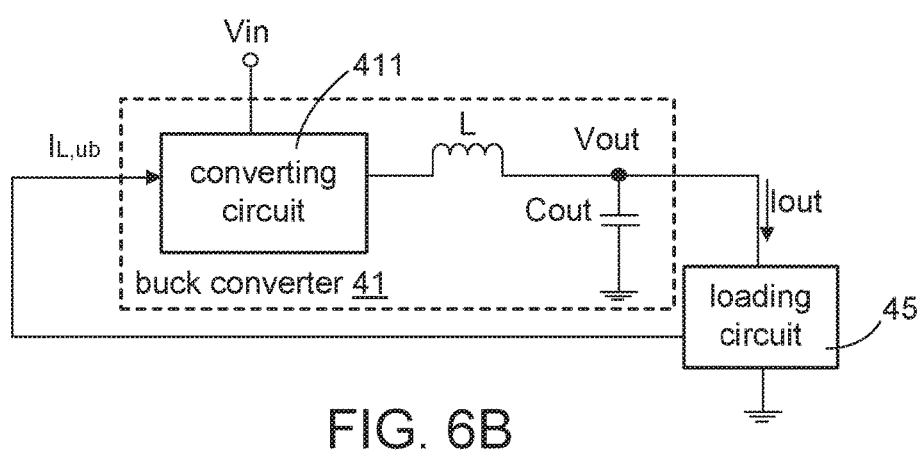

In FIG. 6A, the converting circuit 411 receives the setting signal from a controller 44. The controller 44 can be a microcontroller (hereinafter, MCU), a central processing unit (hereinafter, CPU) or a digital signal processor (hereinafter, DSP). The controller 44 is usually the core of the whole system and the controller 44 is in charge of the operation mode switching of the system. Therefore, the controller 44 can inform the converting circuit 411 the information about the operation mode switching through the setting signal. For example, if the controller 44 is aware that the system is about to enter an operation mode which tends to have heavy loading, the controller 44 transmits the setting signal to inform the buck converter 41 that the upper boundary of the inductor current $I_{L,ub}$ should be increased. In FIG. 6B, the converting circuit 411 receives the setting signal from a loading circuit 45, which can be a controller.

Figure 6C:
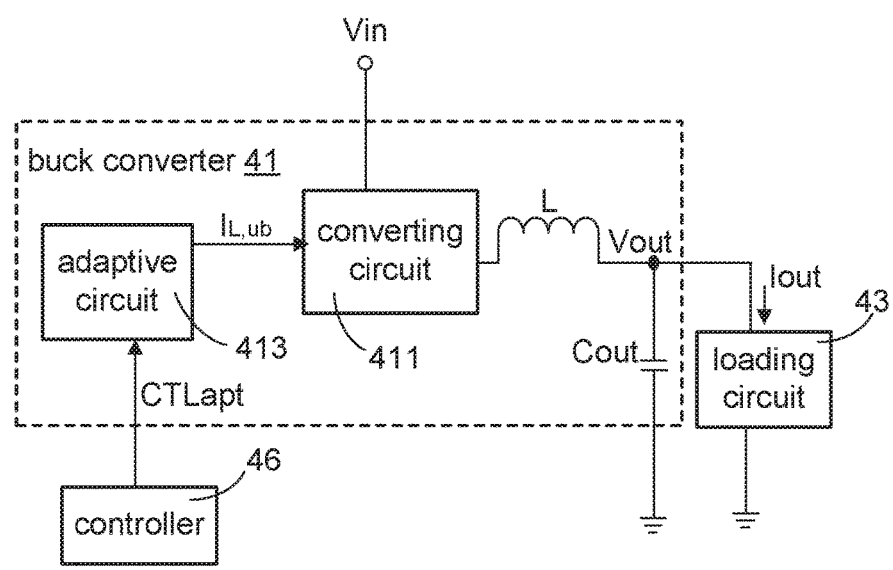

In FIG. 6C, the buck converter 41 further includes an adaptive circuit 413, and the adaptive circuit 413 receives an adaptive control signal CTLapt from a controller 46. With the adaptive control signal CTLapt, the adaptive circuit 413 accordingly generates the setting signal and transmits the setting signal to the converting circuit 411.

Figure 6D:
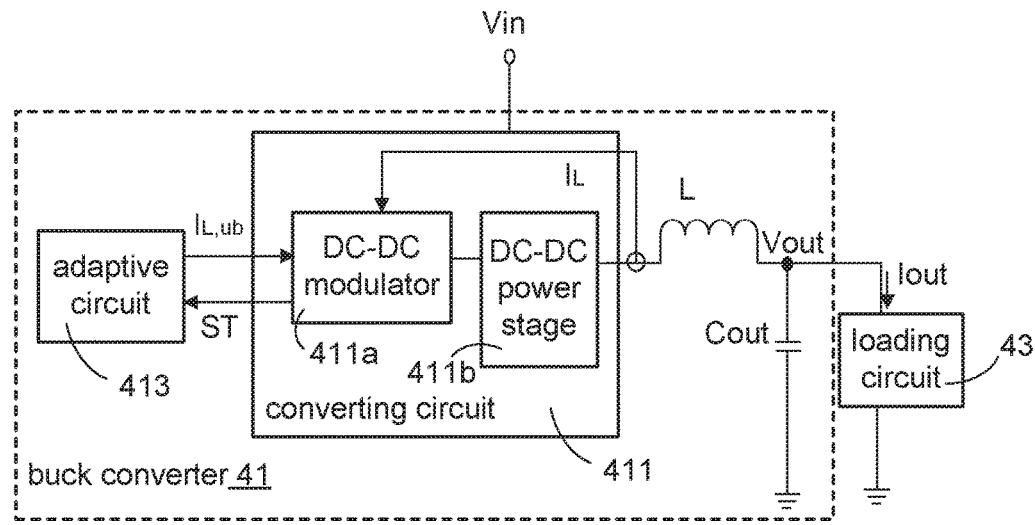

In FIG. 6D, the converting circuit 411 further includes a DC-DC modulator 411a and a DC-DC power stage 411b. The DC-DC modulator 411a receives the inductor current $I_L$ and transmits a status signal ST to the adaptive circuit. The adaptive circuit 413 determines and transmits the upper boundary of the inductor current $I_{L,ub}$ to the DC-DC modulator 411a. More details about operations of the adaptive circuit 413 are illustrated below.

Figure 7:
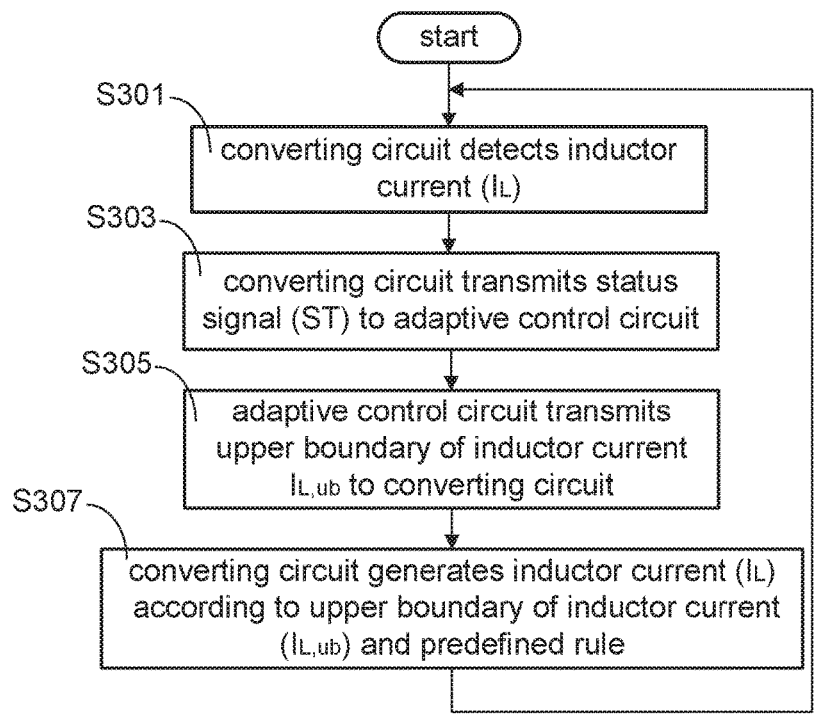
FIG. 7 is a flow chart diagram illustrating the control method applied to the buck converter shown in FIG. 6D.

FIG. 7 is a flow chart diagram illustrating the control method applied to the buck converter shown in FIG. 6D. Firstly, the converting circuit 411 detects the inductor current $I_L$ (step S301). Then, the converting circuit 411 transmits a status signal ST to the adaptive circuit 413 (step S303). According to the embodiment of the present disclosure, the status signal ST is utilized to represent the active duration Tsw and the sleep duration Tsl. When the buck converter 41 is in the active duration Tsw, the status signal ST is set to a first level state (for example, a high level state), and vice versa.

Based on the status signal ST and the predefined rule, the adaptive circuit 413 determines the upper boundary of the inductor current $I_{L,ub}$. The upper boundary of the inductor current $I_{L,ub}$ is further transmitted to the converting circuit 411 (step S305). The converting circuit 411 generates the inductor current $I_L$ according to the upper boundary of the inductor current $I_{L,ub}$ and the predefined rule (step S307). The flow is executed repeatedly.

Figure 8A:
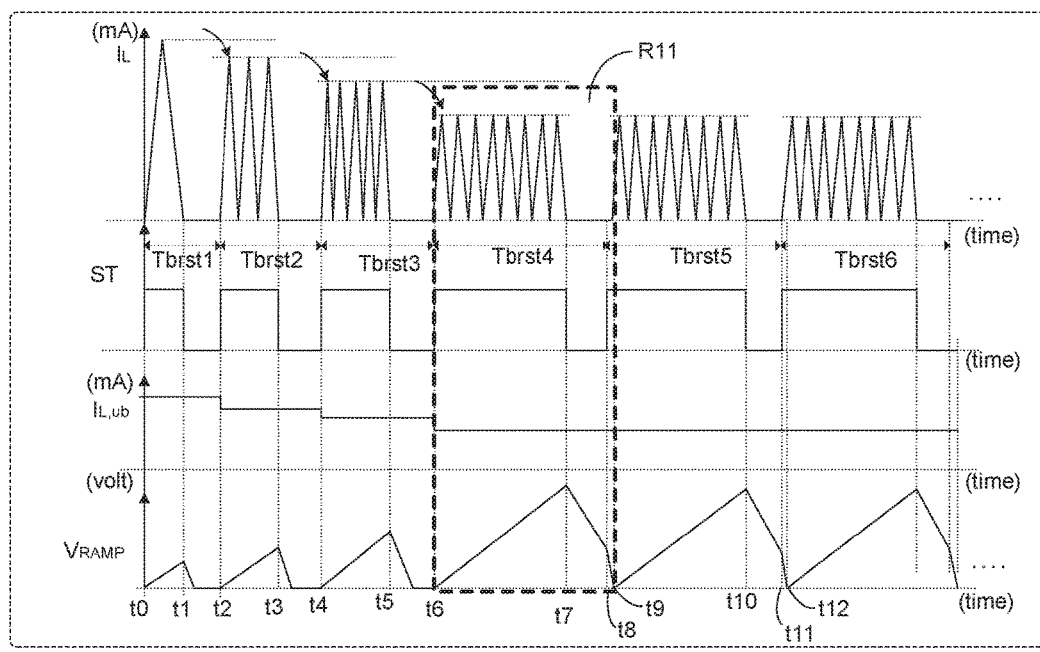
FIGS. 8A, 8B and 8C are schematic waveform diagrams illustrating operation of the adaptive circuit under different application scenarios.
Figure 8B:
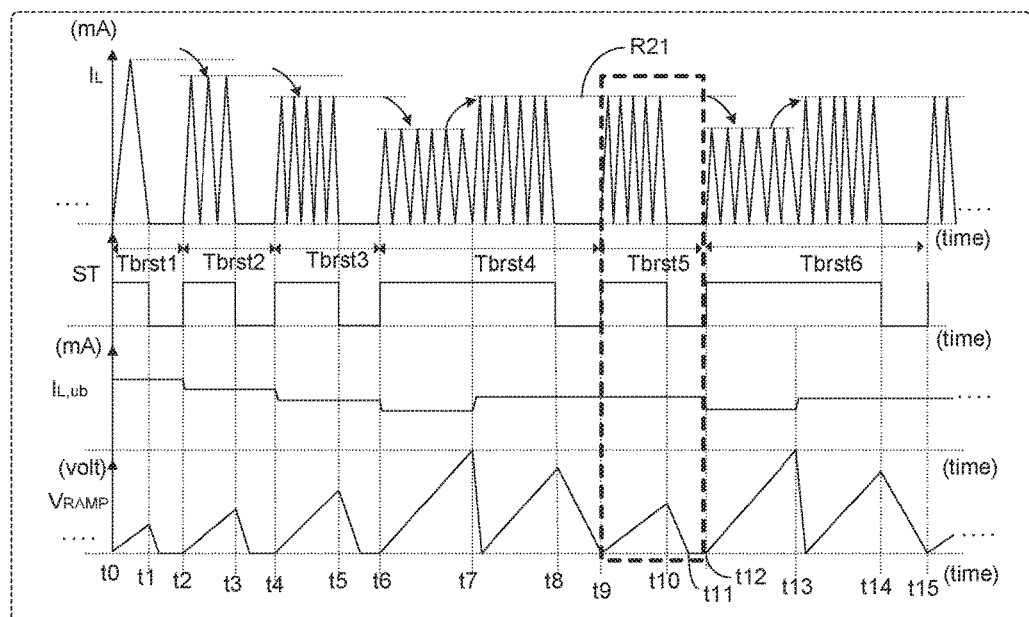
Figure 8C:
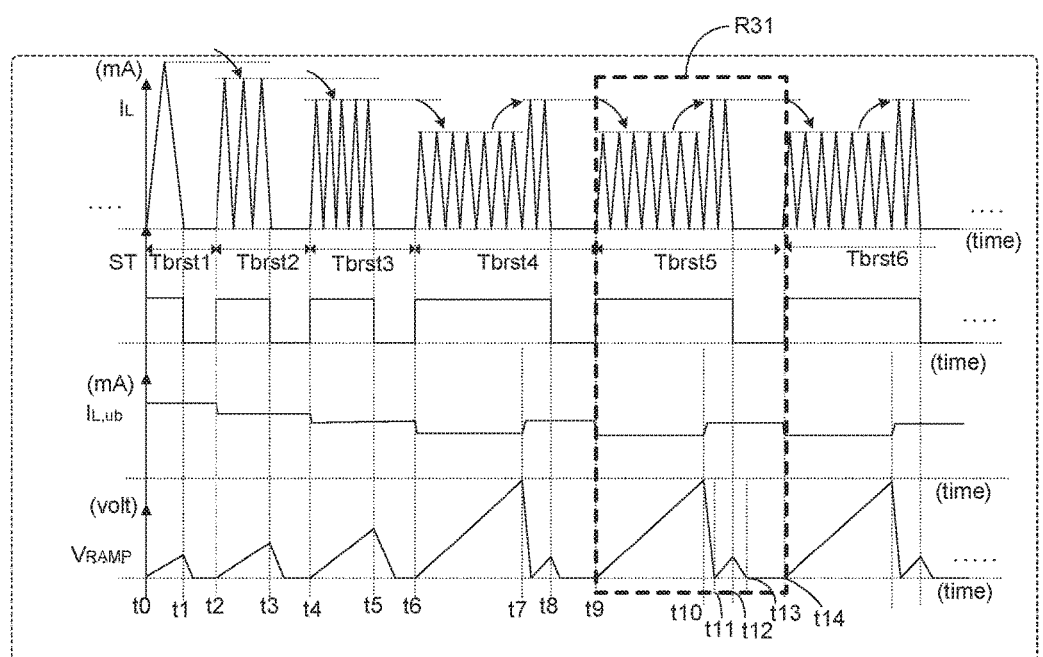

FIGS. 8A, 8B and 8C are schematic waveform diagrams illustrating operation of the adaptive circuit under different scenarios. In these figures, from top to bottom, the signals in the vertical axis are sequentially the inductor current $I_L$, the status signal ST, the upper boundary of the inductor current $I_{L,ub}$, and a ramping voltage $V_{RAMP}$. The ramping voltage $V_{RAMP}$ is related to internal design of the adaptive circuit 413 and will be illustrated later.

The schematic waveform diagram in FIG. 8A is illustrated below. Six burst durations Tbrst1~Tbrst6 are shown in FIG. 8A. In FIG. 8A, the upper boundary of the inductor current $I_{L,ub}$ is adjusted at the beginning of the burst durations Tbrst1~Tbrst4, and the buck converter 41 is at a balanced state since the burst duration Tbrst5.

The burst duration Tbrst1 is between time point t0 and time point t2, and includes an active duration Tsw between time point t0 and time point t1 and a sleep duration Tsl between time point t1 and time point t2. Similarly, each of the burst durations Tbrst2~Tbrst6 includes its own active duration Tsw and sleep duration Tsl, and is not redundantly described herein.

The first waveform in FIG. 8A shows that the peak inductor current $I_{L,pk}$ gradually decreases in the burst duration Tbrst1, Tbrst2, Tbrst3, and Tbrst4.

The second waveform in FIG. 8A shows that state of the status signal ST is corresponding to changes between the active duration Tsw and the sleep duration Tsl of the burst durations Tbrst1~Tbrst6. The pulses of the inductor current $I_L$ during the burst durations Tbrst1~Tbrst6 are corresponding to the status signal ST having a high level state.

According to the first and the second waveforms in FIG. 8A, it can observed that the higher the peak inductor current $I_{L,pk}$ is, the shorter the active duration Tsw is. By definition, the burst duration is equivalent to summation of the active duration Tsw and the sleep duration Tsl, and the sleep duration Tsl of each of the burst durations Tbrst1~Tbrst6 are equivalent. Therefore, the length of the burst durations Tbrst1~Tbrst6 in FIG. 8A can be represented as Tbrst1<Tbrst2<Tbrst3<Tbrst4=Tbrst5=Tbrst6.

The third waveform shows the upper boundary of the inductor current $I_{L,ub}$. In FIG. 8A, the upper boundary of the inductor current $I_{L,ub}$ remains unchanged within each single burst duration Tbrst1~Tbrst6. The adjustment of the upper boundary of the inductor current $I_{L,ub}$ is related to the ramping voltage $V_{RAMP}$. In FIG. 8A, the upper boundary of the inductor current $I_{L,ub}$ is decreased at the beginning of the burst durations Tbrst1~Tbrst3, and the upper boundary of the inductor current $I_{L,ub}$ remains unchanged between the burst duration Tbrst4~Tbrst6.

The schematic waveform diagram in FIG. 8B is illustrated below. Six burst durations Tbrst1~Tbrst6 are shown in FIG. 8B. In FIG. 8B, the upper boundary of the inductor current $I_{L,ub}$ is adjusted at the beginning of the bust durations Tbrst1~Tbrst4, and Tbrst6, and the buck converter 41 is at a balanced state in the burst duration Tbrst5.

The first waveform in FIG. 8B shows that the peak inductor current $I_{L,pk}$ gradually decreases in the burst durations Tbrst1, Tbrst2, and Tbrst3. During the burst duration Tbrst4, the peak inductor current $I_{L,pk}$ is equivalent to a first value between time point t6 and time point t7, and the peak inductor current $I_{L,pk}$ is equivalent to a second value between time point t7 and time point t8.

At the beginning of the burst duration Tbrst5, the buck converter 41 is at a balanced state and the peak inductor current $I_{L,pk}$ remains unchanged as the one in the burst duration Tbrst4. After the burst duration Tbrst5, the peak inductor current $I_{L,pk}$ is lowered between time point t12 and time point t13. Within the active duration Tsw of the burst duration Tbrst6, the peak inductor current $I_{L,pk}$ is increased between time point t13 and time point t14. The sleep duration Tsl of the burst duration Tbrst6 is between time point t14 and time point t15.

The second waveform in FIG. 8B shows that state of the status signal ST is corresponding to changes between the active duration Tsw and the sleep duration Tsl of the burst durations Tbrst1~Tbrst6. The pulses of the inductor current $I_L$ during the burst durations Tbrst1~Tbrst6 are corresponding to the status signal ST having a high level state.

The third waveform shows the upper boundary of the inductor current $I_{L,ub}$. In FIG. 8B, the upper boundary of the inductor current $I_{L,ub}$ remains unchanged within each of the burst durations Tbrst1~Tbrst3. The adjustment of the upper boundary of the inductor current $I_{L,ub}$ is related to the ramping voltage $V_{RAMP}$. In FIG. 8B, the upper boundary of the inductor current $I_{L,ub}$ is decreased at the beginning of the burst durations Tbrst1~Tbrst3, Tbrst4 and Tbrst6, and the upper boundary of the inductor current $I_{L,ub}$ remains unchanged in the burst duration Tbrst5. In the burst durations Tbrst4, Tbrst6, the upper boundary of the inductor current $I_{L,ub}$ is adjustable within the active duration Tsw.

The schematic waveform diagram in FIG. 8C is illustrated below. Six burst durations Tbrst1~Tbrst6 are shown in FIG. 8C. In FIG. 8C, the upper boundary of the inductor current $I_{L,ub}$ is adjusted at beginning of the bust durations Tbrst1~Tbrst6, and the buck converter 41 is at a balanced state in the burst durations Tbrst5 and Tbrst6.

The first waveform in FIG. 8C shows that the peak inductor current $I_{L,pk}$ gradually decreases in the burst durations Tbrst1, Tbrst2, and Tbrst3. During the burst duration Tbrst4, the peak inductor current $I_{L,pk}$ is equivalent to a first value between time point t6 and time point t7, and the peak inductor current $I_{L,pk}$ is equivalent to a second value between time point t7 and time point t8. The pattern of the peak inductor current $I_{L,pk}$ in the burst durations Tbrst5 and Tbrst6 are similar to that in the burst duration Tbrst4.

The second waveform in FIG. 8C shows that state of the status signal ST is corresponding to changes between the active duration Tsw and the sleep duration Tsl of the burst durations Tbrst1~Tbrst6. The pulses of the inductor current $I_L$ during the burst durations Tbrst1~Tbrst6 are corresponding to the status signal ST having a high level state.

The third waveform shows the upper boundary of the inductor current $I_{L,ub}$. In FIG. 8C, the upper boundary of the inductor current $I_{L,ub}$ remains unchanged within each of the burst durations Tbrst1~Tbrst3. The adjustment of the upper boundary of the inductor current $I_{L,ub}$ is related to the ramping voltage $V_{RAMP}$. In FIG. 8C, the upper boundary of the inductor current $I_{L,ub}$ is decreased at the beginning of the burst durations Tbrst1~Tbrst6, and the upper boundary of the inductor current $I_{L,ub}$ remains unchanged in the burst duration Tbrst1~Tbrst3. In the burst durations Tbrst4, Tbrst5, Tbrst6, the upper boundary of the inductor current $I_{L,ub}$ is adjustable within the active duration Tsw.

The implementation of the control method and design of the buck converter 41 may vary. For example, the converting circuit 411 and the adaptive circuit 413 can be implemented in an analog manner or in a digital manner.

Figure 9A:
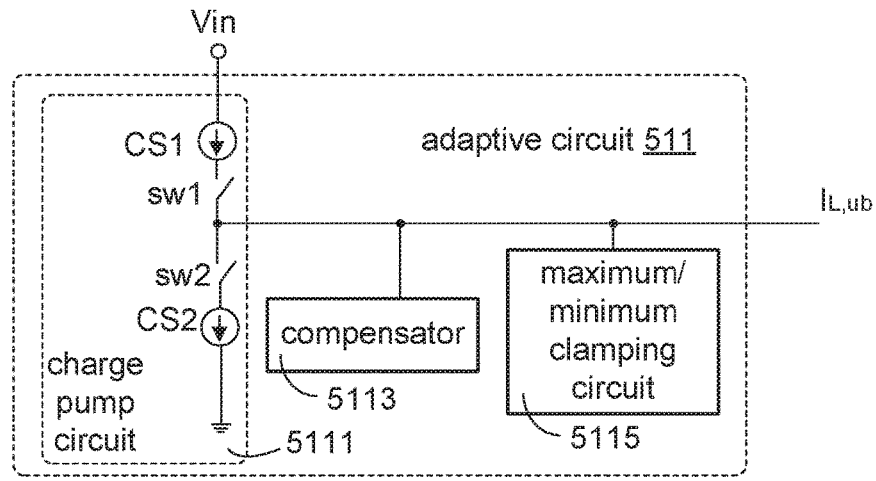
FIG. 9A is a schematic diagram illustrating analog implementation of the adaptive circuit according to the embodiment of the present disclosure.

FIG. 9A is a schematic diagram illustrating analog implementation of the adaptive circuit according to the embodiment of the present disclosure. The adaptive circuit 511 includes a charge pump circuit 5111, a compensator 5113, and a maximum/minimum clamping circuit 5115.

The charge pump circuit 5111 includes an upper portion and a lower portion. The upper portion includes a first current source CS1 and a switch sw1. The lower portion includes a second current source CS2 and a switch sw2. The switching statuses of the switches sw1 and sw2 are related to voltage level of the status signal ST.

The compensator 5113 compensates the output of the charge pump circuit 5111. The maximum/minimum clamping circuit 5115 shifts the output of the charge pump circuit 5111 with a dc voltage in order to generate the setting signal.

Figure 9B:
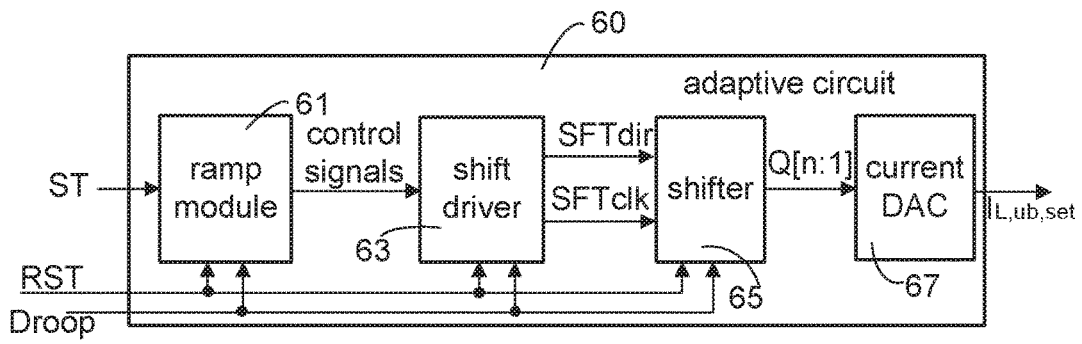
FIG. 9B is a schematic diagram illustrating digital implementation of the adaptive circuit according to the embodiment of the present disclosure.

FIG. 9B is a schematic diagram illustrating the adaptive circuit according to the embodiment of the present disclosure. The adaptive circuit 60 includes a ramp module 61, a shift driver 63, a shifter 65, and a current digital-to-analog converter (hereinafter, DAC) 67. All the ramp module 61, the shift driver 63, the shifter 65, and the current DAC 67 receive a reset signal RST and a droop signal Droop from other circuit (for example, the loading circuit or the controller).

The ramp module 61 receives the status signal ST from the converting circuit 411 and accordingly generates control signals. The control signals are further transmitted to the shift driver 63.

The shift driver 63 generates and transmits a shift direction signal SFTdir and a shift clock signal SFTclk to the shifter 65. The shift direction signal SFTdir represents the upper boundary of the inductor current $I_{L,ub}$ needs to be increased or decreased. The upper boundary of the inductor current $I_{L,ub}$ is increased if the shift direction signal SFTdir is at a first level state (for example, high voltage level), and the upper boundary of the inductor current $I_{L,ub}$ is decreased if the shift direction signal SFTdir is at a second level state (for example, low voltage level). In addition, the shift clock signal SFTclk represents the pulse of the inductor current $I_L$ needs to be shifted. Alternatively speaking, the shift direction signal SFTdir and the shift clock signal SFTclk are corresponding to how the upper boundary of the inductor current $I_{L,ub}$ is adjusted in terms of amount and timing, respectively.

The shifter 65 generates and transmits a digital setting of the upper boundary of the inductor current $I_{L,ub}$ to the current DAC 67. The digital setting of the upper boundary of the inductor current $I_{L,ub}$ is transformed into an analog setting by the current DAC 67. Then, the current DAC 67 transmits the analog setting of the upper boundary of the inductor current $I_{L,ub}$ to the converting circuit 411.

Figure 10:
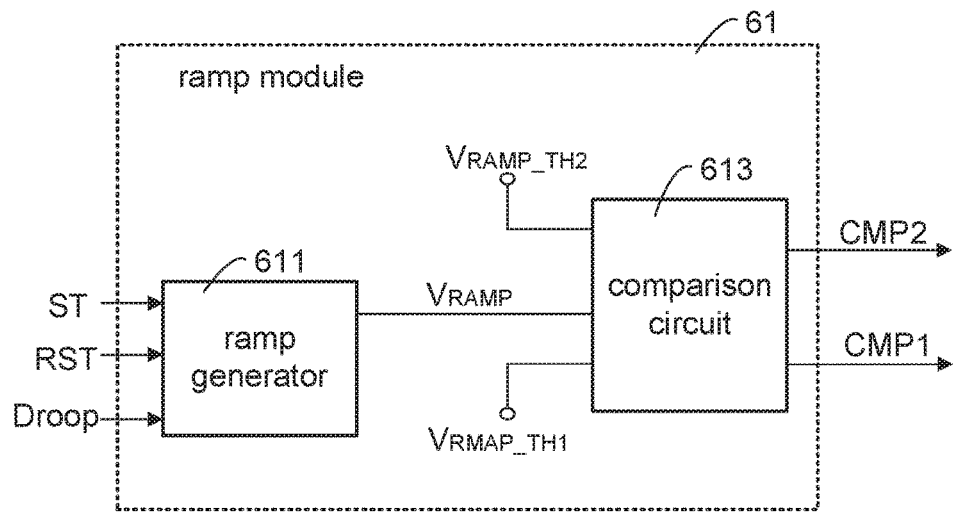
FIG. 10 is a schematic diagram illustrating the ramp module according to the embodiment of the present disclosure.

FIG. 10 is a schematic diagram illustrating the ramp module according to the embodiment of the present disclosure. The ramp module 61 includes a ramp generator 611 and a comparison circuit 613. The ramp generator 611 receives the status signal ST, the reset signal RST and the droop signal Droop. On the other hand, the comparison circuit 613 receives a first threshold setting $V_{RAMP\_TH1}$ and a second threshold setting $V_{RAMP\_TH2}$.

The ramp generator 611 generates a ramping voltage $V_{RAMP}$ to the comparison circuit 613. The ramping voltage $V_{RAMP}$ is referred to adjust setting of the upper boundary of the inductor current $I_{L,ub}$.

After receiving the ramping voltage $V_{RAMP}$, the comparison circuit 613 generates a first comparison signal CMP1 and a second comparison signal CMP2. The first comparison signal CMP1 is generated based on comparing result between the ramping voltage $V_{RAMP}$ and the first threshold setting $V_{RAMP\_TH1}$. The second comparison signal CMP2 is generated based on comparing result between the ramping voltage $V_{RAMP}$ and the second threshold setting $V_{RAMP\_TH2}$.

Figure 11:
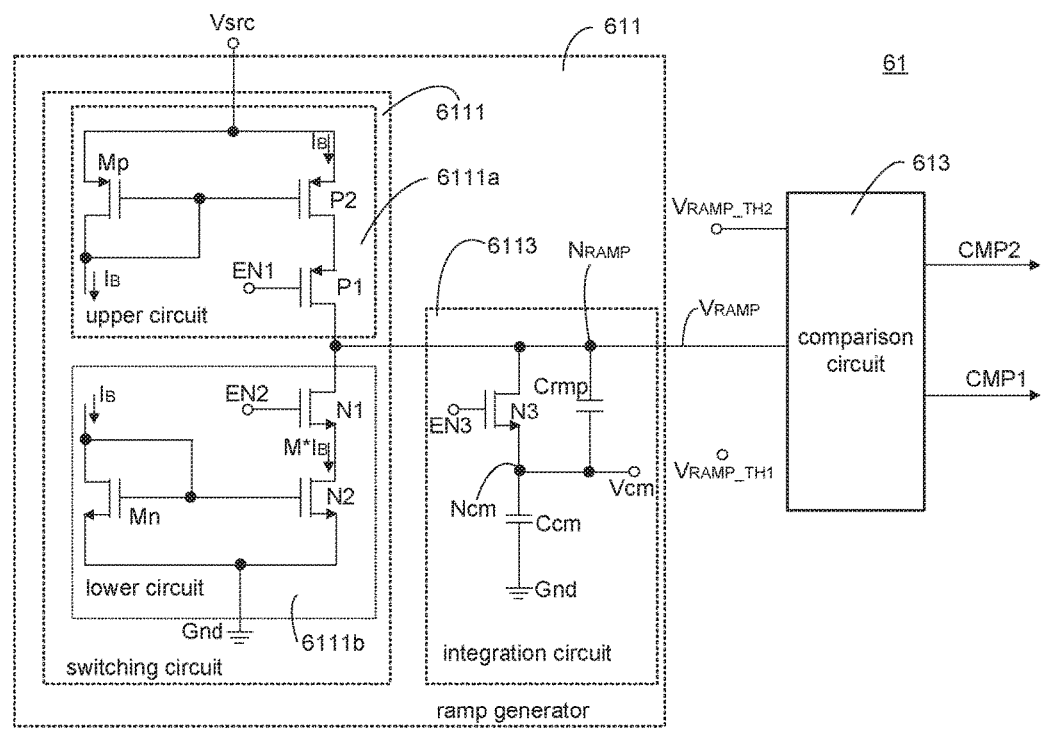
FIG. 11 is a schematic diagram illustrating the ramp generator according to the embodiment of the present disclosure.

FIG. 11 is a schematic diagram illustrating the ramp generator according to the embodiment of the present disclosure. The ramp generator 611 includes two portions, a switching circuit 6111 and an integration circuit 6113. The switching circuit 6111 further includes an upper circuit 6111a and a lower circuit 6111b which are connected to each other. The upper circuit 6111a, the lower circuit 6111b, and the integration circuit 6113 are alternatively enabled. The upper circuit 6111a is electrically connected to a supply voltage terminal (Vsrc), and the lower circuit 6111a is electrically connected to a ground terminal (Gnd).

The upper circuit 6111a includes transistors P1, P2, and Mp. The transistors P2 and Mp jointly form an upper current mirror, and the transistor P1 is controlled by an enable signal EN1. The voltage level of the enable signal EN1 determines whether a charging current is passed to a ramping node $N_{RAMP}$. The charging current is equivalent to a base current ($I_B$). The lower circuit 6111b includes transistors N1, N2, and Mn. The transistors N2 and Mn jointly form a lower current mirror, and the transistor N1 is controlled by another enable signal EN2. The voltage level of the enable signal EN2 determines whether a discharging current is conducted from the ramping node $N_{RAMP}$ to the ground terminal Gnd. The discharging current is equivalent to multiple of the base current ($M*I_B$).

The output of the ramp generator 611, that is, voltage of the ramping node $N_{RAMP}$ is defined as the ramping voltage $V_{RAMP}$. Being compared with the first threshold setting $V_{RAMP\_TH1}$ and the second threshold setting $V_{RAMP\_TH2}$, the ramping voltage $V_{RAMP}$ becomes an indicator showing that how the upper boundary of the inductor current $I_L$ should be adjusted.

The integration circuit 6113 further includes a transistor N3, a common mode capacitor Ccm, and the ramping capacitor Crmp. The transistor N3 and the ramping capacitor Crmp are both electrically connected to the ramping node $N_{RAMP}$ and a common mode node Ncm. The common mode capacitor Ccm is electrically connected to the ramping node $N_{RAMP}$ and the ground terminal Gnd. The transistor N3 is controlled by still another enable signal EN3.

When the enable signal EN3 is at the low level state, a current originating from the ramping node $N_{RAMP}$ flows through the ramping capacitor Crmp and the common mode capacitor Ccm to the ground terminal Gnd. Moreover, the second threshold setting $V_{RAMP\_TH2}$ is set to be equivalent to the voltage of the ramping node $N_{RAMP}$ when both the common mode capacitor Ccm and the ramping capacitor Crmp are fully charged.

When the enable signal EN3 is at the high level state, a current originating from the ramping node $N_{RAMP}$ flows through the common mode capacitor Cbs, not the ramping capacitor Crmp. Therefore, voltage of the common mode node Ncm is kept to be greater than 0V. Moreover, the first threshold setting $V_{RAMP\_TH1}$ is set to be equivalent to the voltage of the common mode node Ncm when the common mode capacitor Ccm is fully charged.

For the converting circuit 411, equation (6) shows that the relationship between the sleep duration Tsl and the active duration (Tsw=N*Tpl) can be represented as $$\alpha = \frac{Tsl}{N \cdot Tpl}.$$

The numerator and the denominator respectively represent the duration that the converting circuit 411 conducts the discharging current and the duration that the converting circuit 411 conducts the charging current. Basically, he charging current and discharging current in the converting circuit 411 are imitated respectively in the upper circuit and the lower circuit of the switching circuit 6111, which is a part of the adaptive circuit. Therefore, the equation $$\alpha = \frac{Tsl}{N \cdot Tpl}$$

originally representing operation of the converting circuit 411 can be referred as bases of controlling the operation of the switching circuit 6111. Consequentially, the ratio $$\left(\alpha = \frac{Tsl}{N \cdot Tpl}\right)$$

between the sleep duration Tsl and the active duration (Tsw=N*Tpl) can be referred to control the discharging current and charging current in the switching circuit 6111. That is $$\alpha = \frac{Tsl}{N \cdot Tpl} = \frac{\text{discharging current}}{\text{charging current}} = M.$$

Figure 12A:
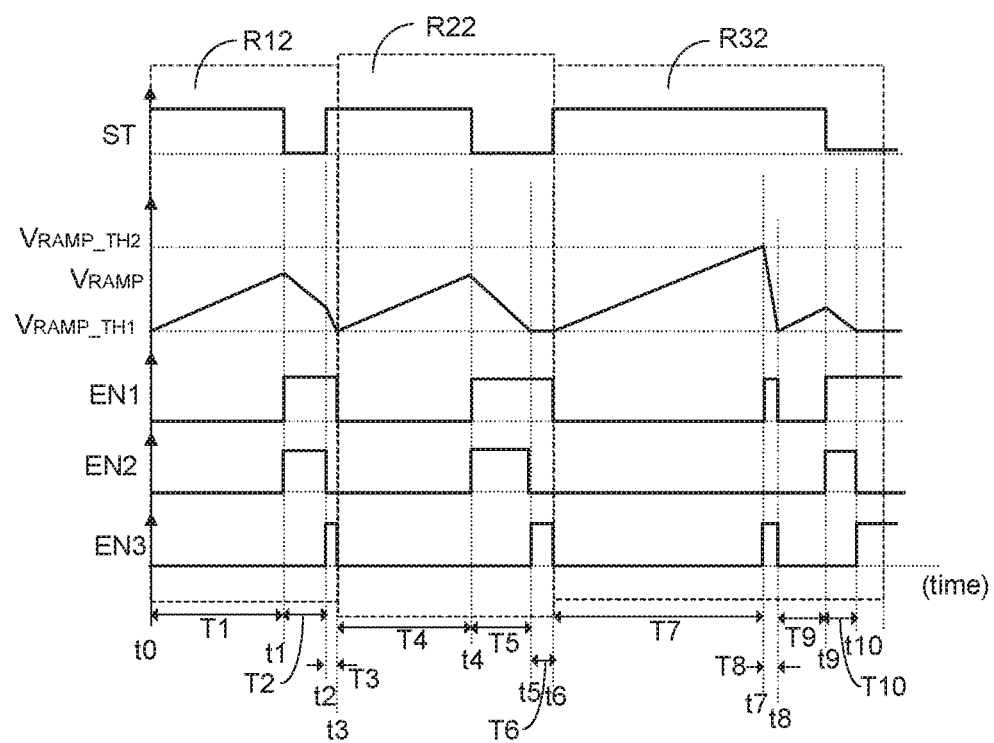
FIG. 12A is a schematic diagram illustrating control signals related to the ramp generator shown in FIG. 11.

FIG. 12A is a schematic diagram illustrating control signals related to the ramp generator shown in FIG. 11. In FIG. 12A, from top to bottom, the signals in the vertical axis are sequentially the status signal ST, the ramping voltage $V_{RAMP}$, and enable signals EN1, EN2 and EN3. The dotted rectangles R12, R22, and R23 are respectively corresponding to the dotted rectangle R11 in FIG. 8A, the dotted rectangle R21 in FIG. 8B, and the dotted rectangle R31 in FIG. 8C.

The dotted rectangle R12 between time point t0 and time point t3 is illustrated below. Between time point t0 and time point t1 (that is, a first time interval T1), the status signal ST is at the high level state. Meanwhile, the enable signals EN1, EN2 and EN3 are at the low level state. Therefore, the transistor P1 is turned on, and the transistors N1 and N3 are turned off. Consequentially, the upper circuit 6111a is conducted so that the ramping voltage $V_{RAMP}$ gradually increases in the first time interval T1.

At time point t1, the ramping voltage $V_{RAMP}$ reaches to a peak value, and the peak value is less than the second threshold setting $V_{RAMP\_TH2}$.

Between time point t1 and time point t2 (that is, a second time interval T2), the status signal ST is at the low level state. Meanwhile, the enable signals EN1 and EN2 are at the high level state, and the enable signal EN3 is at the low level state. Therefore, the transistor P1 is turned off, the transistor N1 is turned on, and the transistor N3 is turned off. Consequentially, the lower circuit 6111b is conducted so that the ramping voltage $V_{RAMP}$ gradually decreases between time point t1 and time point t2.

Between time point t2 and t3 (that is, a third time interval T3), the status signal ST is at the high level state. Meanwhile, the enable signal EN1 is at the high level state, the enable signal EN2 is at the low level state, and the enable signal EN3 is at the high level state. Therefore, the transistors P1 and N2 are turned off, and the transistor N3 is turned on. Consequentially, the ramping node $N_{RAMP}$ is directly connected to the common mode node Ncm so that the ramping voltage $V_{RAMP}$ becomes to be equivalent to the first threshold setting $V_{RAMP\_TH1}$ at time point t3.

The waveform in dotted rectangle R12 can be concluded as follows. In a case that the ramping voltage $V_{RAMP}$ is greater than the first threshold setting $V_{RAMP\_TH1}$ at the end of the burst duration (for example, time point t2 in FIG. 12A), the buck converter 41 is at a balanced state and the upper boundary of the inductor current $I_{L,ub}$ corresponding to the following burst duration Tbrst does not need to be adjusted.

The dotted rectangle R22 between time point t3 and time point t6 is illustrated below. Between time point t3 and time point t4 (that is, a fourth time interval T4), the status signal ST is at the high level state. Meanwhile, the enable signals EN1, EN2 and EN3 are at the low level state. Therefore, the transistor P1 is turned on, and the transistors N1 and N3 are turned off. Consequentially, the upper circuit 6111a is conducted so that the ramping voltage $V_{RAMP}$ gradually increases in the fourth time interval T4.

At time point t4, the ramping voltage $V_{RAMP}$ reaches to a peak value, and the peak value is less than the second threshold setting $V_{RAMP\_TH2}$.

Between time point t4 and time point t5 (that is, a fifth time interval T5), the status signal ST is at the low level state. Meanwhile, the enable signals EN1 and EN2 are at the high level state, and the enable signal EN3 is at the low level state. Therefore, the transistor P1 is turned off, the transistor N1 is turned on, and the transistor N3 is turned off. Consequentially, the lower circuit 6111b is conducted so that the ramping voltage $V_{RAMP}$ gradually decreases in the fifth time interval.

Between time point t5 and time point t6 (that is, a sixth time interval T6), the status signal ST is still at the low level state. Meanwhile, the enable signal EN1 is at the high level state, the enable signal EN2 is at the low level state, and the enable signal EN3 is at the high level state. Therefore, the transistors P1 and N2 are turned off, and the transistor N3 is turned on. Consequentially, the ramping node $N_{RAMP}$ is directly connected to the common mode node Ncm so that the ramping voltage $V_{RAMP}$ becomes to be equivalent to the first threshold setting $V_{RAMP\_TH1}$ at time point t6.

The waveform in dotted rectangle R22 can be concluded as follows. In a case that the ramping voltage $V_{RAMP}$ becomes equivalent to the first threshold setting $V_{RAMP\_TH1}$ at the end of the burst duration (for example, time point t6 in FIG. 12A), the discharging speed of the loading circuit during the sleeping duration Tsl is determined to be slower than the charging speed of the converting circuit 411 during the active duration Tsw. Since the discharging speed of the loading circuit cannot be adjusted, the charging speed of the converting circuit 411 must be adjusted to be lowered. In order to lower the charging speed of converting circuit 411, the peak inductor current $I_{L,pk}$ must be lower, and the upper boundary of the inductor current $I_{L,ub}$ corresponding to the next burst duration Tbrst is decreased based on the predefined rule.

The dotted rectangle R32 between time point t6 and time point t10 is illustrated below. Between time point t6 and time point t7 (that is, a seventh time interval T7), the status signal ST is at the high level state. Meanwhile, the enable signals EN1, EN2 and EN3 are at the low level state. Therefore, the transistor P1 is turned on, and the transistors N1 and N3 are turned off. Consequentially, the upper circuit 6111a is conducted so that the ramping voltage $V_{RAMP}$ gradually increases between time point t6 and time point t7.

At time point t7, the ramping voltage $V_{RAMP}$ reaches to a peak value, and the peak value is equivalent to the second threshold setting $V_{RAMP\_TH2}$. Under such circumstance, the ramping voltage $V_{RAMP}$ exceeds its limitation and needs to be lowered.

Between time point t7 and time point t8 (that is, an eighth time interval T8), the status signal ST is at the high level state. Meanwhile, the enable signal EN1 is at the high level state, the enable signal EN2 is at the low level state, and the enable signal EN3 is at the high level state. Therefore, the transistors P1 and N1 are turned off, and the transistor N3 is turned on. Consequentially, the ramping node $N_{RAMP}$ is directly connected to the common mode node Ncm so that the ramping voltage $V_{RAMP}$ becomes to be equivalent to the first threshold setting $V_{RAMP\_TH1}$ at time point t8.

Between time point t8 and time point t9 (that is, a ninth time interval T9), the status signal ST is still at the high level state. Meanwhile, the enable signals EN1, EN2 and EN3 are at the low level state. Therefore, the transistor P1 is turned on, and the transistors N1 and N3 are turned off. Consequentially, the upper circuit 6111a is conducted so that the ramping voltage $V_{RAMP}$ gradually increases between time point t8 and t9.

At time point t9, the ramping voltage $V_{RAMP}$ reaches to another peak value, which is less than the second threshold setting $V_{RAMP\_TH2}$.

Between time point t9 and time point t10 (that is, a tenth time interval T10), the status signal ST is at the low level state. Meanwhile, the enable signals EN1 and EN2 are at the high level state, and the enable signal EN3 is at the low level state. Therefore, the transistor P1 is turned off, the transistor N1 is turned on, and the transistor N3 is turned off. Consequentially, the lower circuit 6111b is conducted so that the ramping voltage $V_{RAMP}$ gradually decreases between time point t9 and time point t10.

At time point t10, the ramping voltage $V_{RAMP}$ becomes to be equivalent to the first threshold setting $V_{RAMP\_TH1}$.

After time point t10, the status signal ST is still at the low level state. Meanwhile, the enable signal EN1 is at the high level state, the enable signal EN2 is at the low level state, and the enable signal EN3 is at the high level state. Therefore, the transistors P1 and N2 are turned off, and the transistor N3 is turned on. Consequentially, the ramping node $N_{RAMP}$ is directly connected to the common mode node Ncm so that the ramping voltage $V_{RAMP}$ is equivalent to the first threshold setting $V_{RAMP\_TH1}$ after time point t10.

The waveform in dotted rectangle R32 can be concluded as follows. In a case that the ramping voltage $V_{RAMP}$ becomes greater than or equivalent to the second threshold setting $V_{RAMP\_TH2}$ within the burst duration (for example, time points t7, t10 in FIG. 8C, and time point t7 in FIG. 12A), the discharging speed of the loading circuit 43 during the sleeping duration Tsl is determined to be relatively faster than the charging speed of converting circuit 411 during the active duration Tsw. Since the discharging speed of the loading circuit 43 cannot be adjusted, the charging speed of the converting circuit 411 must be adjusted to be raised. In order to raise the charging speed of converting circuit 411, the peak inductor current $I_{L,pk}$ must be greater, and the upper boundary of the inductor current $I_{L,ub}$ corresponding to the next burst duration Tbrst is increased based on the predefined rule.

According to the above illustrations, the dotted rectangle R12 is corresponding to the case that the buck converter 41 is at the balanced state, the dotted rectangle R22 is corresponding to the case that the discharging speed of the loading circuit 43 is relatively faster than the charging speed of the converting circuit 411, and the dotted rectangle R32 is corresponding to the case that discharging speed of the loading circuit 43 is relatively slower than the charging speed of the converting circuit 411. The ramping voltage $V_{RAMP}$ at the end of each burst duration Tbrst is referred to determine whether the upper boundary of the inductor current $I_{L,ub}$ should be adjusted, and how the upper boundary of the inductor current $I_{L,up}$ should be adjusted if adjustment is required. Changes of the ramping voltage $V_{RAMP}$ in FIGS. 8A, 8B and 8C can be analogue to one of the cases shown in dotted rectangles R12, R22, and R32, and are not redundantly described herein.

Based on the waveform in FIG. 12A, the operation of the ramp generator 611 can be classified into several state which are corresponding to different operation statuses of the transistors P1, N1, and N3.

In the first time interval T1, the fourth time interval T4, the seventh time interval T7, and the ninth time interval, while the status signal ST is at the high level state, the ramp generator 611, the transistor P1 is turned on because the enable signal EN1 is at the low level state, the transistor N1 is turned off because the enable signal EN2 is at the low level state, and the transistor N3 is turned off because the enable signal EN3 is at the low level state. For the sake of illustration, an operation state that the transistor P1 is turned on, the transistor N1 is turned off, the transistor N3 is turned off, and the status signal ST is at the high level state is defined as a state A in the following context.

In the second time interval T2, the fifth time interval T5, and the tenth time interval T10, while the status signal ST is at the low level state, the transistor P1 is turned off because the enable signal N1 is at the high level state, the transistor N1 is turned on because the enable signal EN2 is at the high level state, and the transistor N3 is turned off because the enable signal EN3 is at the low level state. For the sake of illustration, an operation state that the transistor P1 is turned off, the transistor N1 is turned on, the transistor N3 is turned off, and the status signal ST is at the low level state is defined as a state B in the following context.

In the third time interval T3 and the eighth time interval T8, while the status signal ST is at the high level state, the transistor P1 is turned off because the enable signal EN1 is at the high level state, the transistor N1 is turned off because the enable signal EN2 is at the low level state, and the transistor N3 is turned on because the enable signal EN3 is at the high level state. For the sake of illustration, an operation state that the transistor P1 is turned off, the transistor N1 is turned off, the transistor N3 is turned on, and the status signal ST is at the high level is defined as a state C in the following context.

Moreover, in the sixth time interval T6, while the status signal ST is at the low level state, the transistor P1 is turned off because the enable signal EN1 is at the high level state, the transistor N1 is turned off because the enable signal EN2 is at the low level state, and the transistor N3 is turned on because the enable signal EN3 is at the high level state. For the sake of illustration, an operation state that the transistor P1 is turned off, the transistor N1 is turned off, the transistor N3 is turned on, and the status signal ST is at the low level is defined as a state D in the following context.

Figure 12B:
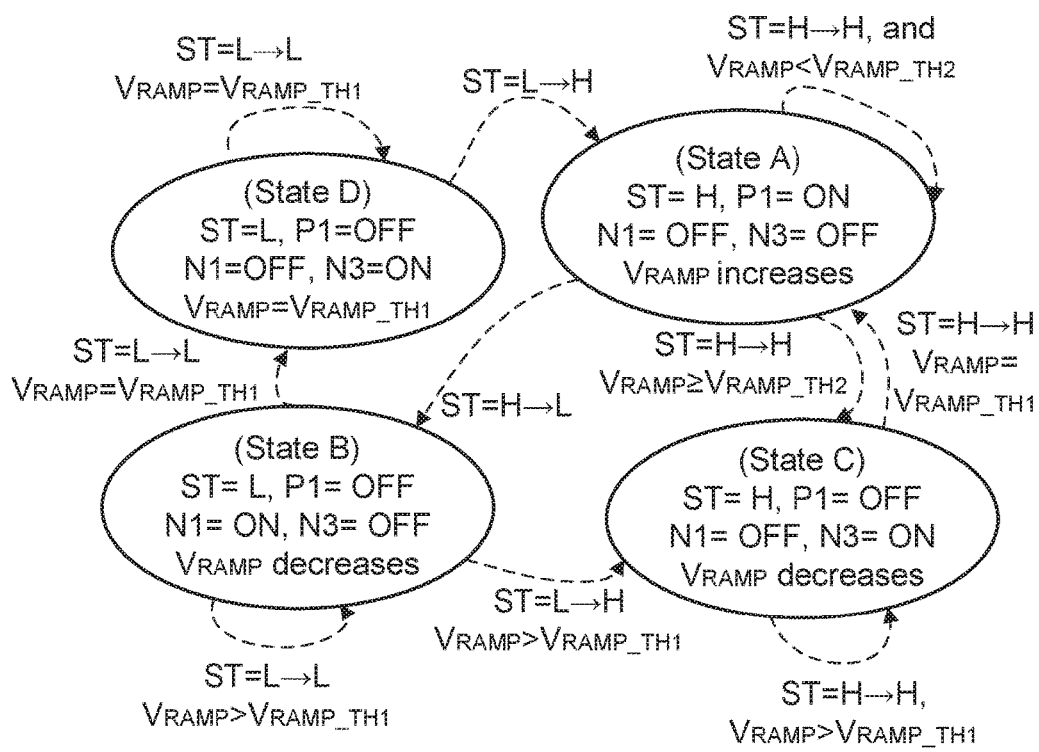
FIG. 12B is a state diagram illustrating state transitions of the ramp generator.
Figure 12C:
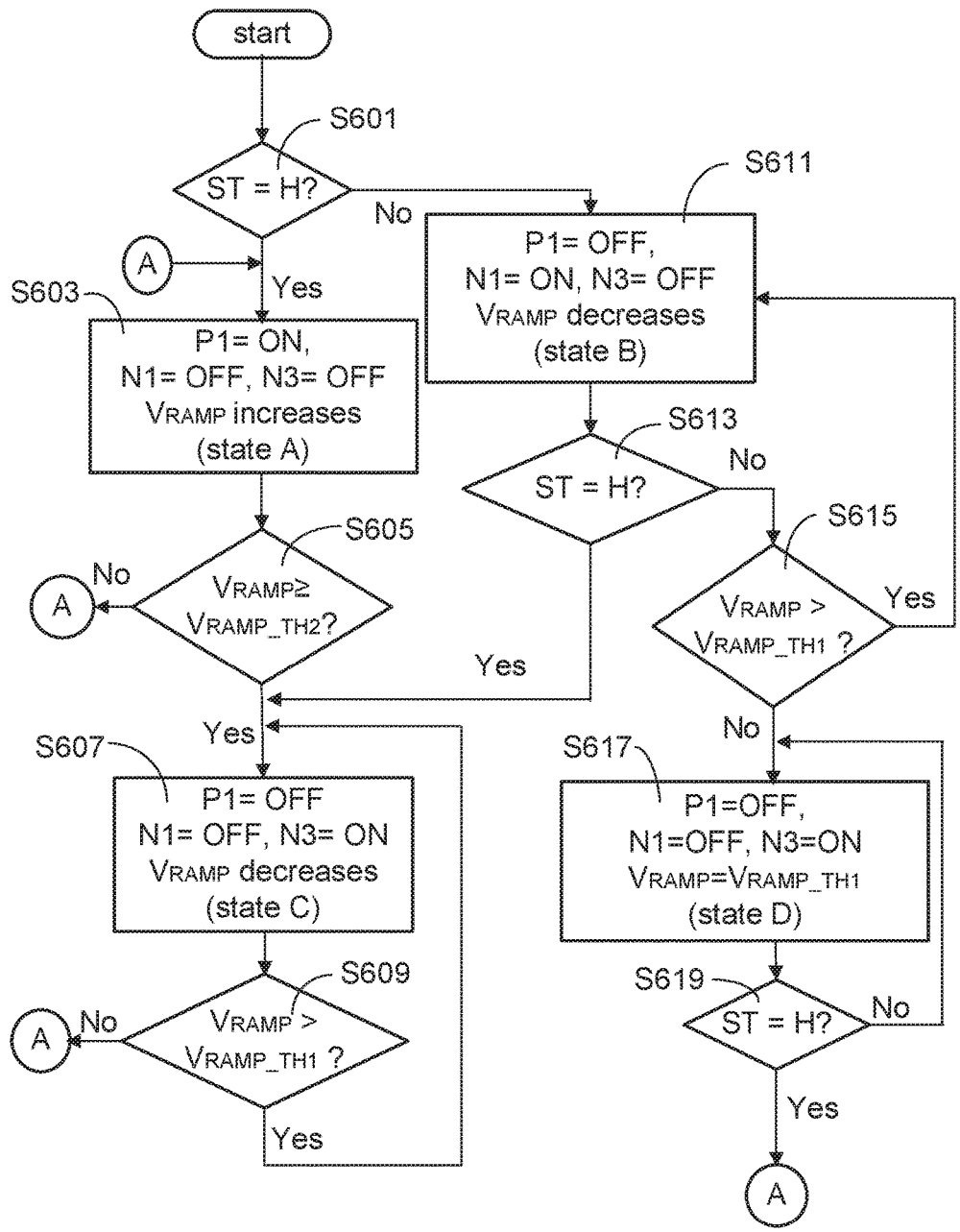
FIG. 12C is a schematic flow diagram illustrating operation of the ramp generator.

A state diagram is shown in FIG. 12B and a flow diagram is shown in FIG. 12C. In FIGS. 12B and 12C, state transitions between the states A~D and how the ramp generator operates at the states A-D are illustrated in detail.

FIG. 12B is a state diagram illustrating behavior of the ramp generator. The ellipses represent different operation states of the ramp generator 611, and the dotted arrows represent transitions between operation states.

When the ramp generator 611 operates at the state A, the lower circuit 6111b and the integration 6113 suspend, and only the upper circuit 611a conducts the charging current to the ramping node $N_{RAMP}$. When the ramp generator 611 operates at the state B, the upper circuit 6111a and the integration 6113 suspend, and only the lower circuit 611b conducts the discharging current to the ramping node $N_{RAMP}$. When the ramp generator 611 operates at the state C, the upper circuit 6111a and the integration 6113 suspend, and only the lower circuit 611b conducts the discharging current to the ramping node $N_{RAMP}$. When the ramp generator 611 operates at the state D, the switching circuit 6111 is disabled and none of the upper circuit and lower circuit affects the ramping voltage $N_{RAMP}$.

FIG. 12C is a schematic flow diagram illustrating operation of the ramp generator. Firstly, the ramp generator 611 determines if the status signal ST is at the high level state (step S601).

If the determination result of step S601 is positive, the transistor P1 is turned on, the transistor N1 is turned off, and the transistor N3 is turned off (step S603). Consequentially, the ramping voltage $V_{RAMP}$ increases. While charging the ramping voltage $V_{RAMP}$, the ramp generator 611 needs to check if the ramping voltage $V_{RAMP}$ becomes greater than or equivalent to the second threshold setting $V_{RAMP\_TH2}$ (step S605).

Please refer to the state A in FIG. 12B and step S605 in FIG. 12C together. In FIG. 12B, a dotted arrow starting from the state A shows that the ramp generator 611 stays to operate in the state A if the status signal ST remains at the high level state and the ramping voltage $V_{RAMP}$ is still less than the second threshold setting $V_{RAMP\_TH2}$. As shown by the negative branch of step S605, in a case that the ramping voltage $V_{RAMP}$ is still lower than the second threshold setting $V_{RAMP\_TH2}$, step S603 is repeatedly repeated executed.

On the other hand, another dotted arrow starting from the state A shows that the ramp generator 611 changes from the state A to the state C if the status signal ST remains at the high level state and the ramping voltage $V_{RAMP}$ becomes greater than or equivalent to the second threshold setting $V_{RAMP\_TH2}$. As shown by the positive branch of step S605, the ramp generator 611 changes to the state C and executes step S607.

When the ramp generator 611 is at the state C, the transistor P1 is turned off, the transistor N1 is turned off, and the transistor N3 is turned on (step S607). Consequentially, the ramping voltage $V_{RAMP}$ decreases. While discharging the ramping voltage $V_{RAMP}$, the ramp generator 611 needs to check if the ramping voltage $V_{RAMP}$ is still greater than the first threshold setting $V_{RAMP\_TH1}$ (step S609).

Please refer to the state C in FIG. 12B and step S609 in FIG. 12C together. In FIG. 12B, a dotted arrow starting from the state C shows that the ramp generator 611 stays to operate in the state C if the status signal ST remains at the high level state and the ramping voltage $V_{RAMP}$ is still greater than the first threshold setting $V_{RAMP\_TH1}$. As shown by the positive branch of step S609, in a case that the ramping voltage $V_{RAMP}$ is still higher than or equivalent to the first threshold setting $V_{RAMP\_TH1}$, step S607 is repeatedly executed.

On the other hand, another dotted arrow starting from the state C shows that the ramp generator 611 changes from the state C to the state A if the status signal ST remains at the high level state and the ramping voltage $V_{RAMP}$ becomes equivalent to the first threshold setting $V_{RAMP\_TH1}$. As shown by the negative branch of step S609, the ramp generator 611 changes to the state A and executes step S603.

If the determination result of step (S601) is negative, the transistor P1 is turned off, the transistor N1 is turned on, and the transistor N3 is turned off (step S6611). Consequentially, the ramping voltage $V_{RAMP}$ decreases. While discharging the ramping voltage $V_{RAMP}$, the ramp generator 611 needs to check if the status signal ST changes to the high level state (step S613).

Please refer to the state B in FIG. 12B and steps S613 and S615 in FIG. 12C together. In FIG. 12B, a dotted arrow starting from the state B shows that the ramp generator 611 changes from the state B to the state C if the status signal ST changes from the low level state to the high level state and the ramping voltage $V_{RAMP}$ is still greater than the first threshold setting $V_{RAMP\_TH1}$. As shown by the positive branch of step S613, the ramp generator 611 changes to the state C and executes step S607.

In FIG. 12B, another dotted arrow starting from the state B shows that the ramp generator 611 stays to operate in the state B if the status signal ST remains at the low level state and the ramping voltage $V_{RAMP}$ is still greater than the first threshold setting $V_{RAMP\_TH1}$. As show in FIG. 12C, step S611 is repeatedly executed if the determination result of step S613 is negative and the determination result of step S615 is positive.

In FIG. 12B, still another dotted arrow starting from the state B shows that the ramp generator 611 changes from the state B to the state D if the status signal ST remains at the low level state and the ramping voltage $V_{RAMP}$ is equivalent to the first threshold setting $V_{RAMP\_TH1}$. As show in FIG. 12C, if the determination result of step S613 is negative, the ramp generator 611 further checks if the ramping voltage $V_{RAMP}$ becomes to be equivalent to the first threshold setting $V_{RAMP\_TH1}$ (step S615). If the determination result of step S615 is negative, the ramping voltage $V_{RAMP}$ is confirmed to be equivalent to the first threshold setting $V_{RAMP\_TH1}$ and step S617 is executed and the ramp generator 611 is at the state D.

At the state D, the transistor P1 is turned off, the transistor N1 is turned off, and the transistor N3 is turned on. Meanwhile, the common mode capacitor Ccm is fully charged and the ramping voltage $V_{RAMP}$ is maintained to be equivalent to the first threshold setting $V_{RAMP\_TH1}$ (step S617). Then, the ramp generator 611 needs to check if the status signal ST changes to the high level state (step S619).

Please refer to the state D in FIG. 12B and step S619 in FIG. 12C together. In FIG. 12B, a dotted arrow starting from the state D shows that the ramp generator 611 stays at the state D if the status signal ST remains at the low level state. As shown by the negative branch of step S619, the ramp generator 611 remains to stay at the state D and repeatedly executes step S617.

In FIG. 12B, another dotted arrow starting from the state D shows that the ramp generator 611 changes from the state D to the state A if the status signal ST changes from the low level state to the high level state. As shown by the positive branch of step S619, the ramp generator 611 changes to the state A and executes step S603.

It should be noted that the ramping voltage $V_{RAMP}$ is always greater than or equivalent to the first threshold setting $V_{RAMP\_TH1}$ because of the integration circuit 6113. Therefore, the negative determination results of steps S609 and S615 imply that the ramping voltage $V_{RAMP}$ is equivalent to the first threshold setting $V_{RAMP\_TH1}$.

Figure 13A:
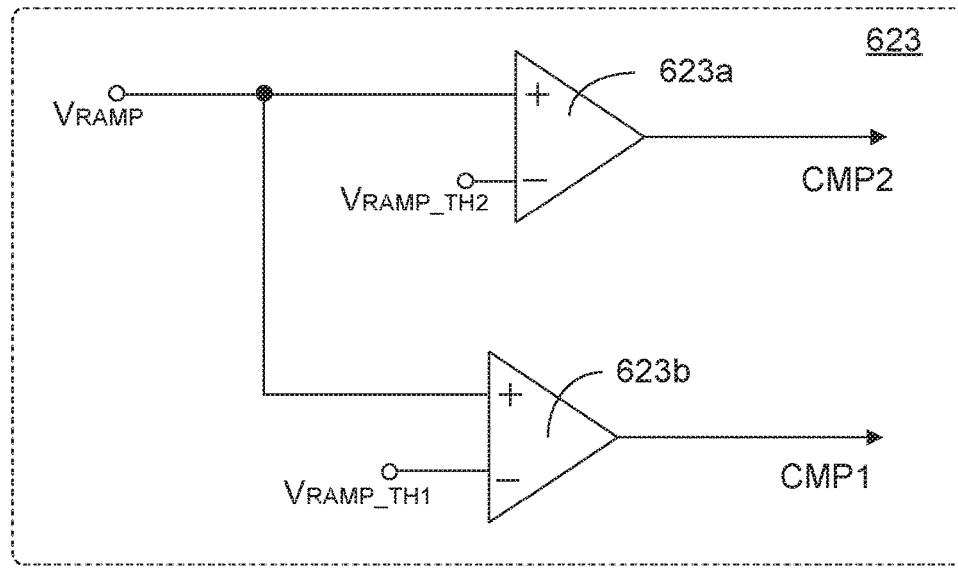
FIGS. 13A and 13B are schematic diagrams illustrating implementation of the comparison circuit according to the embodiment of the present disclosure.
Figure 13B:
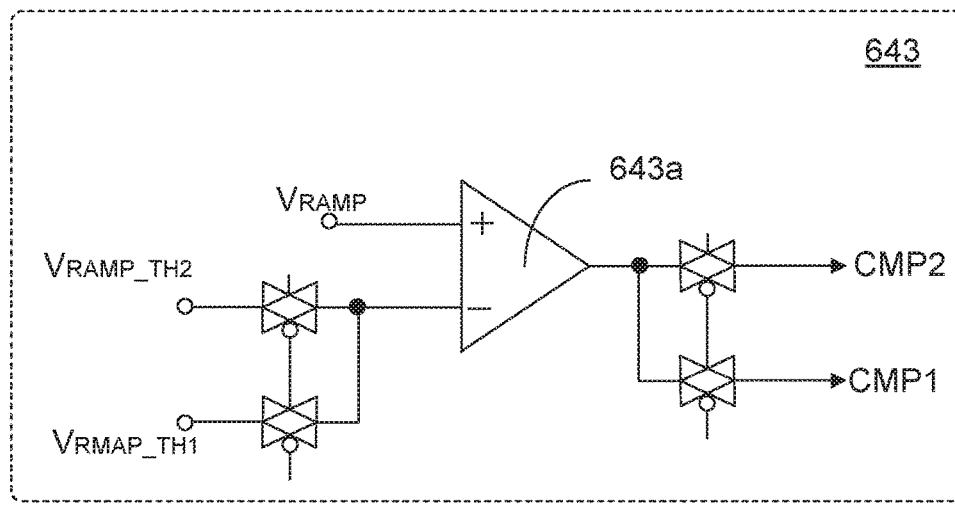

FIGS. 13A and 13B are schematic diagrams illustrating implementation of the comparison circuit according to the embodiment of the present disclosure.

In FIG. 13A, two comparators 623a, 623b are used. A comparator 623b compares the ramping voltage $V_{RAMP}$ with the first threshold setting ($V_{RAMP\_TH1}$) to generate a comparison signal CMP1, and another comparator 623a compares the ramping voltage $V_{RAMP}$ with the second threshold setting ($V_{RAMP\_TH1}$) to generate another comparison signal CMP2. The comparison signals CMP1, CMP2 are utilized to generate control signals being transmitted to the shift driver 63.

FIG. 13B shows another implementation of the comparison circuit 643. With utilization of transmission gates, only one comparator 643a is needed. The operation of the comparator 643a in FIG. 13B is similar to the comparators 623a, 623b and is not redundantly described herein.

As mentioned in FIGS. 9 and 10, in addition to the status signal ST, the ramp module 61 also receives a reset signal RST and a droop signal Droop. The ramp module 61 receives the reset signal RST when the ramp module 61 is initiated. On the other hand, the ramp module 61 receives the droop signal Droop when the ramp module 61 is in operation. The droop signal Droop is generated by a droop circuit, and the droop circuit generates the droop signal Droop based on comparison of the output voltage Vout and a droop threshold Vdroop_th.

According to the embodiment of the present disclosure, the upper boundary of the inductor current $I_{L,ub}$ is set to a first default value when the ramp module 61 receives pulse of the reset signal RST, and the upper boundary of the inductor current $I_{L,ub}$ is set to a second default value when the ramp module 61 receives pulse of the droop signal Droop. The first default value and the second default vale may be or may not be equivalent. The second default value can be, for example, a maximum value of the upper boundary of the inductor current $I_{L,ub,max}$.

Figure 14:
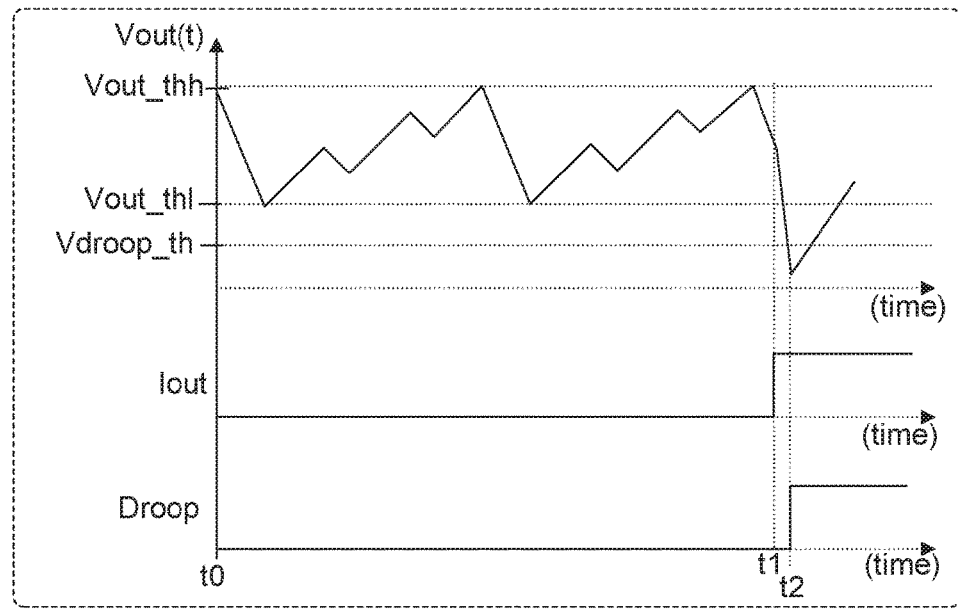
FIG. 14 is a schematic waveform diagram illustrating generation of the droop signal according to the embodiment of the present disclosure.

FIG. 14 is a schematic waveform diagram illustrating generation of the droop signal according to the embodiment of the present disclosure. Between time point t0 and time point t1, the output voltage Vout changes between the lower threshold Vout_thl and the upper threshold Vout_thh.

At time point t1, the output current Iout suddenly increases, so that the detected output voltage Vout drops significantly and becomes lower than the lower threshold Vout_thl.

At time point t2, the output voltage Vout becomes lower than the droop threshold Vdroop_th. Therefore, the droop signal Droop is set to be at the high level state at time point t2.

According to the embodiment of the present disclosure, the upper boundary of the inductor current $I_{L,ub}$ is then set to the second default value if the droop signal Droop changes to the high level state. In consequence, the peak inductor current $I_{L,pk}$ can changes to a much greater value to recover change of the output current Iout. Therefore, the stability of the peak inductor current $I_{L,pk}$ and the output current Iout can be maintained.

Figure 15:
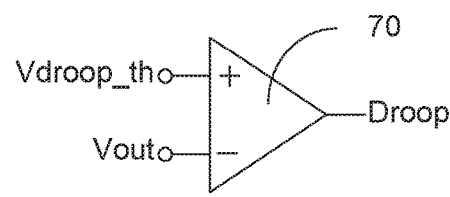
FIG. 15 is a schematic diagram illustrating a droop circuit according to the embodiment of the present disclosure.

FIG. 15 is a schematic diagram illustrating a droop circuit according to the embodiment of the present disclosure. The comparator 70 is implemented by an operational amplifier. An inverting input terminal of the operational amplifier receives the output voltage Vout, and a non-inverting input terminal of the operational amplifier receives the droop threshold Vdroop_th. The output terminal of the operational amplifier is the droop signal Droop.

With the comparator 70, the output voltage Vout is detected and the output boundary of the inductor current $I_{L,ub}$ can be quickly restored to the second default value if the output voltage Vout drops significantly. With such mechanism, the buck converter 41 can react significant dropping of the output voltage Vout immediately.

Figure 16:
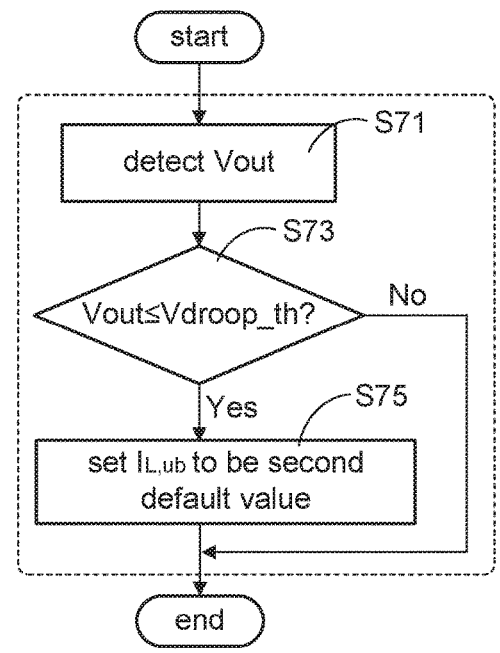
FIG. 16 is a flow diagram illustrating setting of the upper boundary of the inductor current is changed in response to the droop signal.

FIG. 16 is a flow diagram illustrating setting of the upper boundary of the inductor current is changed in response to the droop signal. Firstly, the output voltage Vout is detected (step S71). Then, the output voltage Vout is compared with the droop threshold Vdroop_th (step S73). If the output voltage Vout is greater than the droop threshold Vdroop_th, the flow ends. If the output voltage Vout is less than or equivalent to the droop threshold Vdroop_th, the upper boundary of the inductor current $I_{L,ub}$ is set to the second default value.

Figure 17:
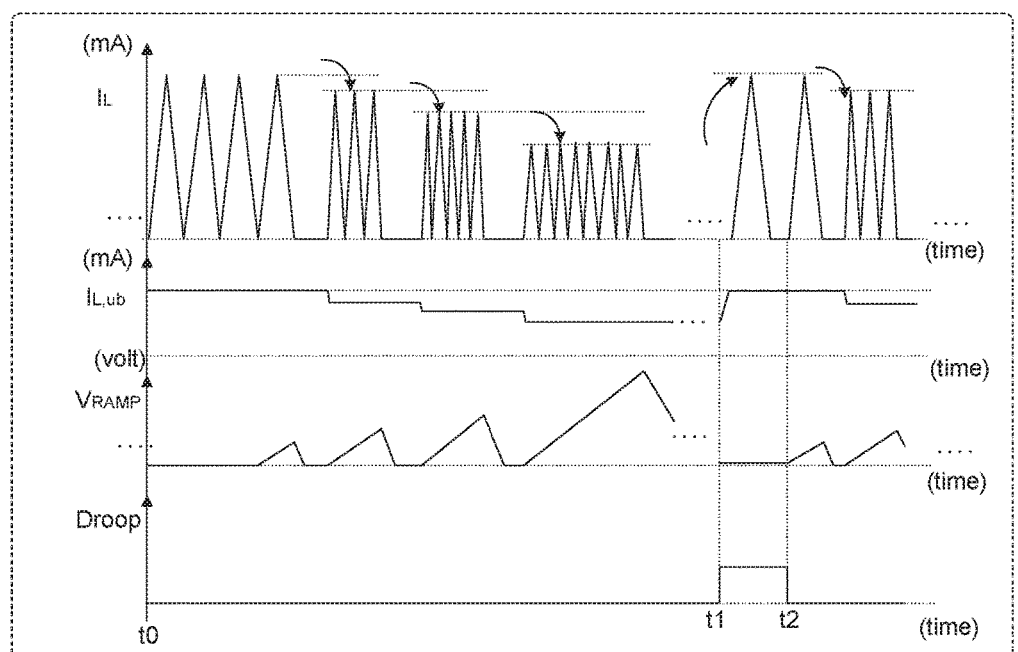
FIG. 17 is a schematic waveform diagram illustrating operation of the buck converter in response to the droop signal according to the embodiment of the present disclosure.

FIG. 17 is a schematic waveform diagram illustrating operation of the buck converter in response to the droop signal according to the embodiment of the present disclosure. The doop signal Droop is at the low level state between time point t0 and time point t1, and changes to the high level state between time point t1 and time point t2.

Before time point t1, both the peak inductor current $I_{L}pk$ and the upper boundary of the inductor current $I_{L,ub}$ gradually decrease. Meanwhile, peak of the ramping voltage $V_{RAMP}$ is increased in the burst durations Tbrst before time point t1.

At time point t1, peak inductor current $I_{L,pk}$ and the upper boundary of the inductor current $I_{L,ub}$ dramatically increase to the second default value. The peak of the ramping voltage $V_{RAMP}$ is increased in the burst durations Tbrst after time point t2.

As illustrated above, the proposed control method allows the buck converter 41 capable of operating under some range of loading in the PFM mode. The operation of the boost converter in the PFM mode has similar issues of the buck converter 41, and the control method based on the embodiment of the present application can provide the same benefits for a buck-boost converter and a boost converter.

Figure 18A:
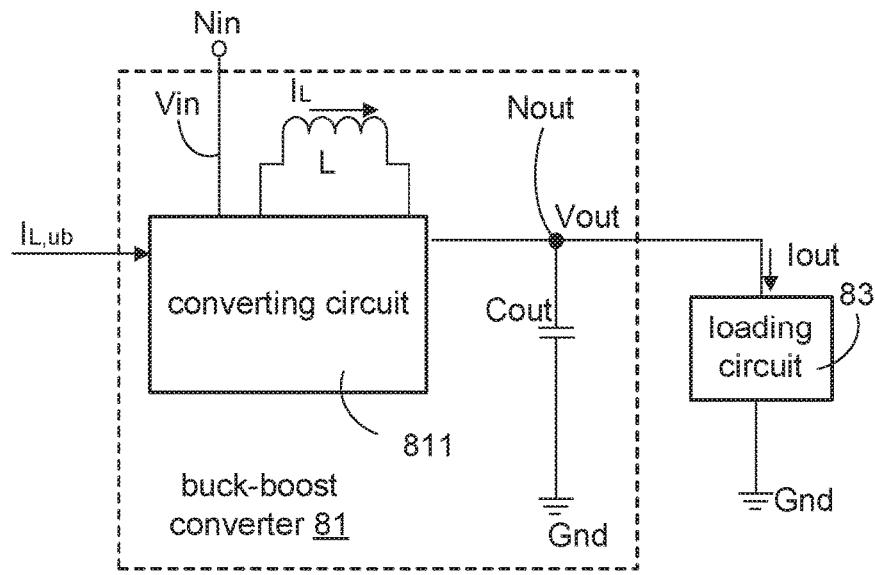
FIGS. 18A and 18B are schematic diagrams illustrating buck-boost converters according to the embodiment of the present disclosure.
Figure 18B:
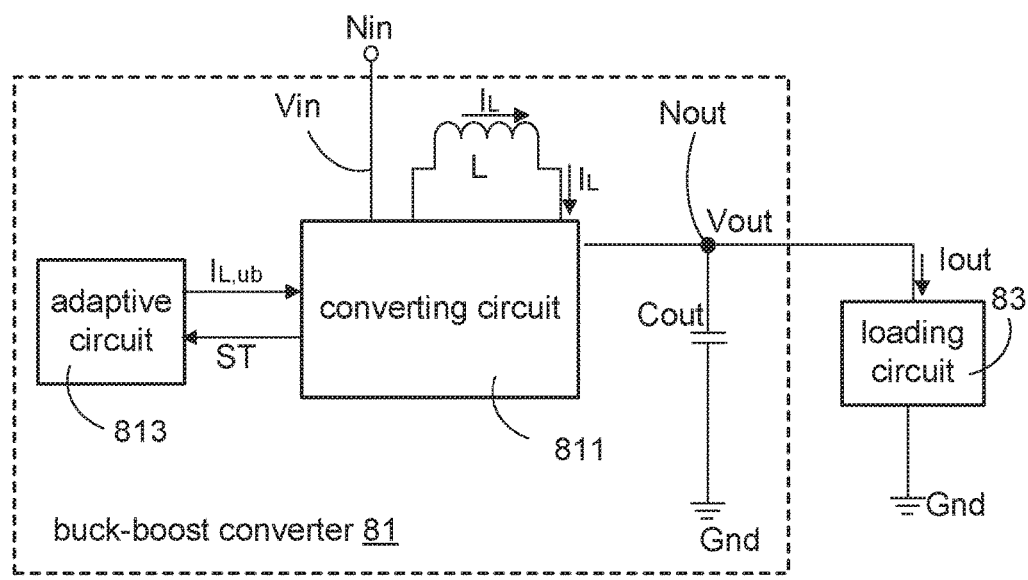

FIGS. 18A and 18B are schematic diagrams illustrating buck-boost converters according to the embodiment of the present disclosure. The buck-boost converter 81 includes a converting circuit 811, an inductor L, and an output capacitor Cout. The two terminals of the inductor L are electrically connected to the converting circuit 811. The converting circuit 811 is electrically connected to the input terminal Nin. The converting circuit 811, the output capacitor Cout and the loading circuit 83 are jointly electrically connected to the output terminal Nout.

In FIG. 18A, the buck-boost converter 81 receives the setting signal from external so that the converting circuit 811 can control the inductor current $I_L$. In FIG. 19B, the buck-boost converter 81 includes an adaptive circuit 813 which generates the setting signal.

Please refer to FIGS. 3 and 18B together. The pulse duration Tpl includes the first sub-pulse duration dt1 and the second sub-pulse duration dt2. The inductor current $I_L$ during the first sub-pulse duration dt1 can be represented as Vin/L, and the inductor current $I_L$ during the second sub-pulse duration dt2 can be represented as Vout/L. Moreover, the inductor current $I_L$ during the first sub-pulse duration dt1 times the first sub-pulse duration dt1 is equivalent to the inductor current $I_L$ during the second sub-pulse duration dt2 times the second sub-pulse duration dt2, see equation (9).

$$\frac{V_{in}}{L} \cdot dt1 = \frac{V_{out}}{L} \cdot dt2 \qquad \text{equation (9)}$$

Relationship between the first sub-pulse duration dt1 and the second sub-pulse duration dt2 can be represented as equation (10).

$$dt1 = \frac{V_{out}}{V_{in}} \cdot dt2 \qquad \text{equation (10)}$$

The average of output current $I_{out,avg}$ can be represented as equation (11).

$$I_{out,avg} = \frac{I_{L,pk} \cdot dt2}{2 \cdot (dt1 + dt2)} = \frac{I_{L,pk}}{2} \cdot \frac{1}{1 + V_{out}/V_{in}} \qquad \text{equation (11)}$$

Accordingly, the active duration Tsw can be obtained based on the average of output current $I_{out,avg}$ and the number of pulses during the active duration N. The variable $V_r$ is a ripple voltage representing changes of the output voltage Vout.

$$Tsw = N \cdot Tpl = \frac{C_{out} \cdot V_r}{I_{out,avg} - Iout} = \frac{C_{out} \cdot V_r}{\frac{I_{L,pk}}{2} \cdot \frac{1}{1 + V_{out}/V_{in}} - Iout} \qquad \text{equation (12)}$$

On the other hand, the sleep duration Tsl can be represented as equation (13).

$$Tsl = \frac{C_{out} \cdot V_r}{Iout} \qquad \text{equation (13)}$$

According to equations (12) and (13), a predefined rule about determining the optimized upper boundary of inductor current $I_{L,ub}$ can be represented in equation (14).

$$I_{L,ub,opt} \approx 2 \cdot \left(1 + \frac{Vout}{Vin}\right) \cdot (Iout + \Delta I_L) \qquad \text{equation (14)}$$

Similar to the buck converter 41, the predefined rule can be utilized by the buck-boost converter 81 to adjust relationship between the active duration N*Tpl and the sleep duration Tsl.

According to a first example of the predefined rule, the margin inductor current $\Delta I_L$ can be defined to be equivalent to a ratio of the output current Iout, that is $\Delta I_L = \alpha^*$Iout. The ratio $\alpha$ is constant regardless change of the output current Iout. Then, based on equation (14) and the margin inductor current $\Delta I_L = \alpha^*$Iout, a relationship similar to equation (6) can be conducted.

According to a second example of the predefined rule, the margin inductor current $\Delta I_L$ can be defined to be a constant current Iconst, that is, $\Delta I_L =$Iconst. Then, based on equation (14) and $\Delta I_L =$Iconst, a relationship similar to equation (8) can be conducted.

Therefore, the above illustrations related to the buck converter 41 can be easily analogue to the buck-boost converter 81, and details about implementation of the adaptive circuit for the buck-boost converter 81 are not redundantly described herein.

Figure 19A:
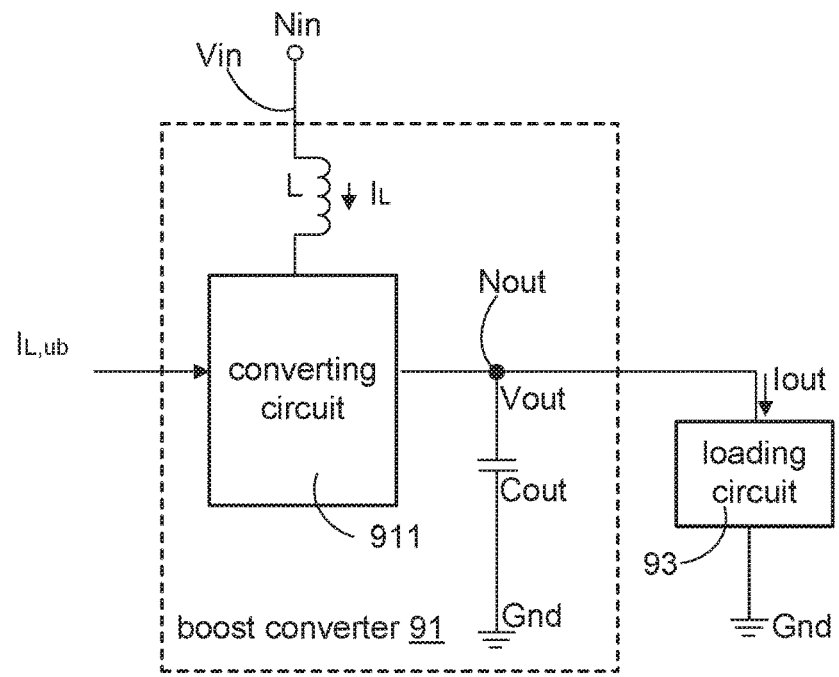
FIGS. 19A and 19B are schematic diagrams illustrating boost converters according to the embodiment of the present disclosure.
Figure 19B:
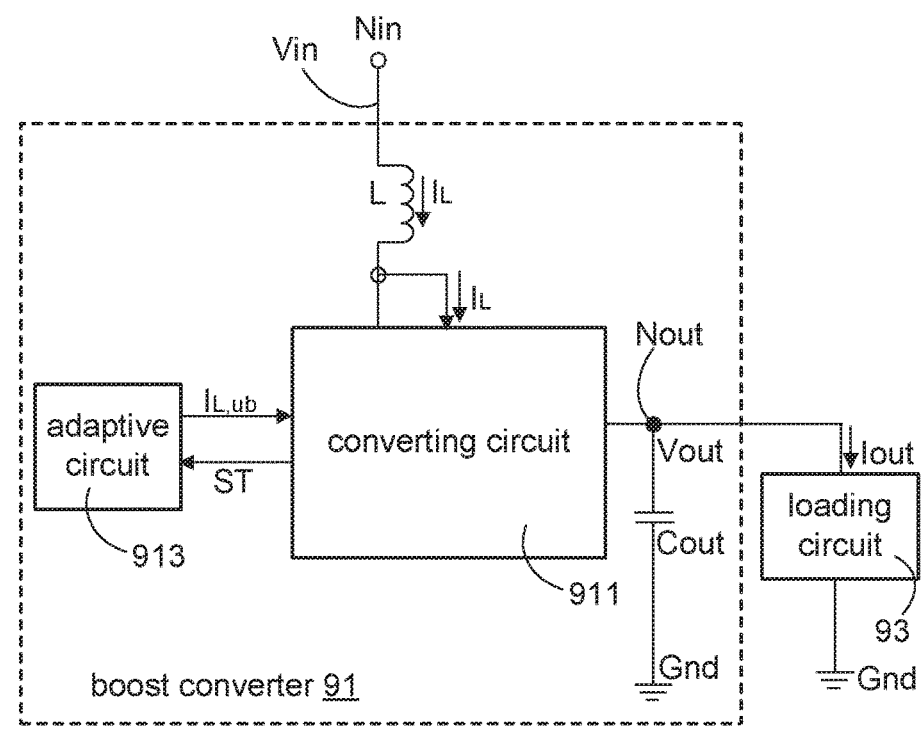

FIGS. 19A and 19B are schematic diagrams illustrating boost converters according to the embodiment of the present disclosure. The boost converter 91 includes a converting circuit 911, an inductor L, and an output capacitor Cout. The inductor L is electrically connected to the input terminal Nin and the converting circuit 911. The converting circuit 911, the output capacitor Cout and the loading circuit 93 are jointly electrically connected to the output terminal Nout.

In FIG. 19A, the boost converter 91 receives the setting signal from external. In FIG. 19B, the boost converter 91 includes an adaptive circuit 913 which generates the setting signal.

Please refer to FIGS. 3 and 19B together. The pulse duration Tpl includes the first sub-pulse duration dt1 and the second sub-pulse duration dt2. The charges being charged during the first sub-pulse duration dt1 is equivalent to the charges being discharged during the second sub-pulse duration dt2, and the equivalence can be represented as equation (15).

$$\frac{V_{in}}{L} \cdot dt1 = \frac{V_{out} - V_{in}}{L} \cdot dt2 \qquad \text{equation (15)}$$

Therefore, the first sub-pulse duration dt1 can be represented by the second sub-pulse duration dt2 as shown in equation (16).

$$dt1 = \frac{V_{out} - V_{in}}{V_{in}} \cdot dt2 \qquad \text{equation (16)}$$

Based on the relationship between the first sub-pulse duration dt1 and the second sub-pulse duration dt2, the average of output current $I_{out,avg}$ can be represented as equation (17).

$$I_{out,avg} = \frac{I_{L,pk} \cdot dt2}{2 \cdot (dt1 + dt2)} = \frac{I_{L,pk}}{2} \cdot \frac{V_{in}}{V_{out}} \qquad \text{equation (17)}$$

Accordingly, the active duration Tsw can be obtained based on the average of output current $I_{out,avg}$ and the number of pulses during the active duration N. The variable $V_r$ is a ripple voltage representing changes of the output voltage Vout.

$$Tsw = N \cdot Tpl = \frac{C_{out} \cdot V_r}{I_{out,avg} - Iout} = \frac{C_{out} \cdot V_r}{\frac{I_{L,pk}}{2} \cdot \frac{V_{in}}{V_{out}} - Iout} \qquad \text{equation (18)}$$

On the other hand, the sleep duration Tsl can be represented as equation (19).

$$Tsl = \frac{C_{out} \cdot V_r}{Iout} \qquad \text{equation (19)}$$

According to equations (18) and (19), a predefined rule about determining the optimized upper boundary of inductor current $I_{L,ub}$ can be represented in equation (20).

$$I_{L,ub,opt} \approx \left(\frac{2 \cdot V_{Out}}{V_{in}}\right) \cdot (Iout + \Delta I_L) \qquad \text{equation (20)}$$

According to a first example of the predefined rule, the margin inductor current $\Delta I_L$ can be defined to be equivalent to a ratio of the output current Iout, that is $\Delta I_L = \alpha * $Iout. The ratio $\alpha$ is constant regardless change of the output current Iout. Then, based on equation (20) and the margin inductor current $\Delta I_L = \alpha * $Iout, a relationship similar to equation (6) can be conducted.

According to a second example of the predefined rule, the margin inductor current $\Delta I_L$ can be defined to be a constant current Iconst, that is, $\Delta I_L = $Iconst. Then, based on equation (20) and the margin inductor current $\Delta I_L = $Iconst, a relationship similar to equation (8) can be conducted.

Therefore, the above illustrations related to the buck converter 41 can be easily analogue to the boost converter 91, and details about implementation of the adaptive circuit 913 for the boost converter 91 are not redundantly described herein.

As illustrated above, the upper boundary of the inductor current $I_{L,ub}$ can be dynamically adjusted even if the output current Iout changes slightly. The origin of the setting signal representing the upper boundary is not limited, and such control method can be easily applied to different types of the DC-DC voltage converters. An internal implementation of the source of the setting signal, that is, the adaptive circuit, is further illustrated. The implementation of the adaptive circuit is not limited either. By providing tolerance of the various output current Iout, the DC-DC voltage converter does not need to frequently switch between PFM mode and PWM mode.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A DC-DC voltage converter, electrically connected to an input terminal having an input voltage and an output terminal having an output voltage, for converting the input voltage to the output voltage, wherein the DC-DC voltage converter operates in a pulse frequency modulation mode and comprises:
    an inductor, wherein an inductor current flows through the inductor;
    a converting circuit, electrically connected to the inductor, for detecting the inductor current, generating a status signal according to the inductor current, and adjusting the inductor current according to a setting signal so that the inductor current is less than or equivalent to an upper boundary of the inductor current, wherein the status signal is at a first level state when the inductor current is in an active duration, and the status signal is at a second level state when the inductor current is in a sleep duration, wherein length of the active duration is related to the upper boundary of the inductor current; and
    an adaptive circuit comprising a ramp module, electrically connected to the converting circuit, for dynamically determining the upper boundary of the inductor current based on the detected inductor current and a predefined rule, wherein the ramp module comprises:
        a ramp generator, electrically connected to the converting circuit, for receiving the status signal and accordingly generating a ramping voltage; and
        a comparison circuit, electrically connected to the ramp generator, for generating at least one comparison signal based on the ramping voltage and at least one threshold setting.

2. The DC-DC voltage converter according to claim 1, wherein the setting signal is generated or received by the converting circuit.

3. The DC-DC voltage converter according to claim 2, wherein the converting circuit receives the setting signal from a loading circuit, a controller or an adaptive circuit.

4. The DC-DC voltage converter according to claim 1, wherein the adaptive circuit is electrically connected to a controller and the adaptive circuit receives an adaptive control signal from the controller.

5. The DC-DC voltage converter according to claim 1, wherein the predefined rule is related to at least one of an output current flowing through a loading circuit electrically connected to the output terminal, a margin inductor current, an operation mode of the loading circuit, the input voltage and the output voltage.

6. The DC-DC voltage converter according to claim 1, wherein the adaptive circuit further comprises:
    a shift driver, electrically connected to the ramp module, for receiving the at least one comparison signal from the ramp module and accordingly generating a shift direction signal and a shift clock signal;
    a shifter, electrically connected to the shift driver, for receiving the shift direction signal and the shift clock signal and accordingly generating a digital setting of the upper boundary; and
    a current digital-to-analog converter, electrically connected to the shifter, for transforming the digital setting of the upper boundary to an analog setting of the upper boundary.

7. The DC-DC voltage converter according to claim 1, wherein the ramp generator comprises:
    a switching circuit, electrically connected to the comparison circuit through a ramping node, comprising:
        an upper circuit, for generating a charging current to increase the ramping voltage; and
        a lower circuit, for generating a discharging current to decrease the ramping voltage; and
    an integration circuit, electrically connected to the ramping node, for changing the ramping voltage to a first threshold setting.

8. The DC-DC voltage converter according to claim 7, wherein the upper circuit, the lower circuit and the integration circuit are respectively controlled by a first enable signal, a second enable signal, and a third enable signal, wherein the upper circuit, the lower circuit and the integration circuit are alternatively enabled.

9. The DC-DC voltage converter according to claim 1, wherein
    the adaptive circuit changes the upper boundary of the inductor current to a first default value when the adaptive control signal is a reset signal.

10. The DC-DC voltage converter according to claim 1, wherein
    the adaptive circuit changes the upper boundary of the inductor current to a second default value when the adaptive control signal is a droop signal, wherein the droop signal is generated when the output voltage is lower than a droop threshold.

11. The DC-DC voltage converter according to claim 1, wherein
the input voltage is greater than the output voltage if the converting circuit is electrically connected to the input terminal, and the inductor is electrically connected to the output terminal.

12. The DC-DC voltage converter according to claim 1, wherein
the input voltage is less than the output voltage if the inductor is electrically connected to the input terminal and the converting circuit is electrically connected to the output terminal.

13. The DC-DC voltage converter according to claim 1, wherein
the input voltage is greater than or less than the output voltage if the inductor is disconnected to the input and the output terminals and the converting circuit is electrically connected to the input and the output terminals.

14. The DC-DC voltage converter according to claim 1, wherein
when the DC-DC voltage converter is at a balanced state, the output voltage is between a lower threshold and a higher threshold.

15. A control method applied to a DC-DC voltage converter, wherein the DC-DC voltage converter operates in a pulse frequency modulation mode, the DC-DC voltage converter comprises an inductor and a converting circuit, and the control method comprises steps of:

receiving an input voltage at an input terminal;
converting the input voltage to an output voltage at an output terminal, wherein an inductor current flows through the inductor;
detecting the inductor current;
generating a status signal according to the inductor current, wherein the status signal is at a first level state when the inductor current is in an active duration, and the status signal is at a second level state when the inductor current is in a sleep duration;
adjusting the inductor current according to a setting signal so that the inductor current is less than or equivalent to an upper boundary of the inductor current related to length of the active duration; and
dynamically determining the upper boundary of the inductor current based on the detected inductor current and a predefined rule,
wherein the status signal is received to generate a ramping voltage accordingly, and at least one comparison signal is generated based on the ramping voltage and at least one threshold setting.

16. The control method according to claim 15, further comprising a step of:
generating the setting signal; or
receiving the setting signal, wherein the setting signal represents the upper boundary of the inductor current.

* * * * *